US011822383B2

(12) United States Patent
Chen et al.

(10) Patent No.: US 11,822,383 B2
(45) Date of Patent: Nov. 21, 2023

(54) ELECTRONIC APPARATUS

(71) Applicant: Lenovo (Beijing) Limited, Beijing (CN)

(72) Inventors: Xi Chen, Beijing (CN); Yiting Hu, Beijing (CN); Zhe Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/474,042

(22) Filed: Sep. 13, 2021

(65) Prior Publication Data

US 2022/0100228 A1 Mar. 31, 2022

(30) Foreign Application Priority Data

Sep. 30, 2020 (CN) .......................... 202011063067.1

(51) Int. Cl.
*G06F 1/16* (2006.01)

(52) U.S. Cl.
CPC .......... *G06F 1/1616* (2013.01); *G06F 1/1652* (2013.01); *G06F 1/1684* (2013.01)

(58) Field of Classification Search
CPC .... G06F 1/1605; G06F 1/1615; G06F 1/1622; G06F 1/1632
See application file for complete search history.

(56) References Cited

U.S. PATENT DOCUMENTS

| 4,408,835 A | * | 10/1983 | Deprez | F16M 11/10 312/22 |
| 5,329,289 A | * | 7/1994 | Sakamoto | G06F 1/16 248/922 |
| 5,629,833 A | * | 5/1997 | Ido | G06F 1/1616 361/679.01 |
| 5,683,064 A | * | 11/1997 | Copeland | F16M 11/08 248/278.1 |
| 5,708,561 A | * | 1/1998 | Huilgol | G06F 1/1688 361/679.55 |
| D428,411 S | * | 7/2000 | Poole | D14/337 |

(Continued)

FOREIGN PATENT DOCUMENTS

| CN | 1697462 A | 11/2005 |
| CN | 101383858 A | 3/2009 |

(Continued)

*Primary Examiner* — Adrian S Wilson
(74) *Attorney, Agent, or Firm* — ANOVA LAW GROUP, PLLC

(57) ABSTRACT

An electronic apparatus includes: a first body including a first side and a second side arranged opposite to each other, and including a first input/output device disposed at the first side; a second body including a third side and a fourth side arranged opposite to each other, and including a second input/output device disposed at the third side; and a connector disposed at the first side and the fourth side. The second body rotates relative to the first body through the connector. During rotation of the second body, orientations of the first side and the third side substantially satisfy a same condition. The electronic apparatus includes a first attitude and a second attitude, which are switchable through the rotation of the second body. The second body does not block the first input/output device when the electronic apparatus is in the first attitude and the second attitude.

11 Claims, 19 Drawing Sheets

(56) References Cited

U.S. PATENT DOCUMENTS

| | | | | |
|---|---|---|---|---|
| 6,105,919 A * | 8/2000 | Min | ............... | F16M 11/10 |
| | | | | 248/418 |
| D453,509 S * | 2/2002 | Kazamaki | ............... | D14/374 |
| 6,639,788 B1 * | 10/2003 | Liao | ............... | G06F 1/1601 |
| | | | | 361/679.22 |
| 6,643,127 B1 * | 11/2003 | Richardson | ............... | G06F 1/1632 |
| | | | | 312/223.4 |
| 7,016,181 B2 * | 3/2006 | Ito | ............... | G06F 1/1632 |
| | | | | 345/169 |
| 7,082,028 B2 * | 7/2006 | Huilgol | ............... | G06F 1/1637 |
| | | | | 248/125.1 |
| 7,433,185 B1 * | 10/2008 | Curran | ............... | G07G 1/0018 |
| | | | | 361/679.41 |
| 7,546,150 B2 * | 6/2009 | Makino | ............... | H04M 1/0247 |
| | | | | 455/566 |
| 7,587,226 B2 * | 9/2009 | Makino | ............... | G06F 1/1681 |
| | | | | 455/575.3 |
| 7,869,200 B2 * | 1/2011 | Horie | ............... | G06F 1/1601 |
| | | | | 361/679.17 |
| 8,047,489 B2 * | 11/2011 | Watanabe | ............... | H04N 5/64 |
| | | | | 248/274.1 |
| 8,200,296 B2 * | 6/2012 | Arakane | ............... | G06F 1/1616 |
| | | | | 455/566 |
| 8,230,992 B2 * | 7/2012 | Law | ............... | G06F 1/1626 |
| | | | | 248/176.1 |
| 8,310,823 B2 * | 11/2012 | Stoltz | ............... | G06F 1/169 |
| | | | | 361/679.16 |
| D673,567 S * | 1/2013 | Yang | ............... | D14/434 |
| 8,934,232 B2 * | 1/2015 | Hsu | ............... | G06F 1/1662 |
| | | | | 361/679.56 |
| 9,131,756 B2 * | 9/2015 | Hurst | ............... | A45C 11/00 |
| 9,241,422 B2 * | 1/2016 | Hsu | ............... | G06F 1/1662 |
| 9,588,550 B2 * | 3/2017 | Smith | ............... | G06F 1/1613 |
| 10,133,102 B1 * | 11/2018 | Liu | ............... | F16M 13/02 |
| 11,068,028 B1 * | 7/2021 | Cubrilovic | ............... | F21V 33/0052 |
| 2003/0227746 A1 * | 12/2003 | Sato | ............... | G06F 1/1632 |
| | | | | 361/679.57 |
| 2003/0235029 A1 * | 12/2003 | Doherty | ............... | G06F 1/1632 |
| | | | | 361/679.27 |
| 2004/0203527 A1 * | 10/2004 | Matsumoto | ............... | H04N 7/142 |
| | | | | 455/90.3 |
| 2004/0224732 A1 * | 11/2004 | Lee | ............... | H04M 1/0247 |
| | | | | 455/566 |
| 2006/0007644 A1 * | 1/2006 | Huilgol | ............... | G06F 1/1616 |
| | | | | 248/917 |
| 2006/0061958 A1 * | 3/2006 | Solomon | ............... | G06F 1/1616 |
| | | | | 361/679.41 |
| 2006/0290812 A1 * | 12/2006 | Hsu | ............... | G06F 1/16 |
| | | | | 715/718 |
| 2009/0225504 A1 * | 9/2009 | Wu | ............... | F16M 11/10 |
| | | | | 361/679.21 |
| 2010/0014230 A1 * | 1/2010 | Horie | ............... | G06F 1/1656 |
| | | | | 361/679.01 |
| 2010/0134964 A1 * | 6/2010 | Smith | ............... | H04M 1/04 |
| | | | | 361/679.02 |
| 2011/0221319 A1 * | 9/2011 | Law | ............... | G06F 1/1626 |
| | | | | 16/337 |
| 2015/0222986 A1 * | 8/2015 | Hagman | ............... | H04R 1/44 |
| | | | | 381/334 |
| 2015/0288405 A1 * | 10/2015 | Gygax | ............... | H04M 1/04 |
| | | | | 455/575.1 |
| 2016/0041582 A1 * | 2/2016 | Kim | ............... | G06F 1/181 |
| | | | | 361/679.22 |
| 2017/0023975 A1 * | 1/2017 | Nalbandian | ............... | G06F 1/1626 |
| 2018/0031172 A1 * | 2/2018 | van Bergen | ............... | G06F 1/1635 |
| 2019/0258292 A1 * | 8/2019 | Schatz | ............... | G06F 1/1683 |
| 2020/0126369 A1 * | 4/2020 | Liu | ............... | G07G 5/00 |
| 2020/0285276 A1 * | 9/2020 | Lin | ............... | G06F 1/1618 |

FOREIGN PATENT DOCUMENTS

| | | |
|---|---|---|
| CN | 205490754 U | 8/2016 |
| CN | 110073309 A | 7/2019 |
| CN | 110953466 A | 4/2020 |
| CN | 111425715 A | 7/2020 |

* cited by examiner

ELECTRONIC APPARATUS

CROSS-REFERENCE TO RELATED APPLICATION

This application claims priorities to Chinese Patent Application No. 202011063067.1 filed on Sep. 30, 2020, the entire content of which is incorporated herein by reference.

TECHNICAL FIELD

The present disclosure relates to the technical field of electronics and, more particularly, to an electronic apparatus.

BACKGROUND

At present, electronic apparatuses such as displays and all-in-one computers have a relatively uniform attitude when in use. The uniform attitude is insufficient for users who want different attitudes.

SUMMARY

One aspect of the present disclosure includes an electronic apparatus. The electronic apparatus includes: a first body including a first side and a second side arranged opposite to each other, and including a first input/output device disposed at the first side; a second body including a third side and a fourth side arranged opposite to each other, and including a second input/output device disposed at the third side; and a connector disposed at the first side and the fourth side. The second body rotates relative to the first body through the connector. During rotation of the second body, orientations of the first side and the third side substantially satisfy a same condition. The electronic apparatus includes a first attitude and a second attitude, which are switchable through the rotation of the second body. The second body does not block the first input/output device when the electronic apparatus is in the first attitude and the second attitude.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

Figure 1:
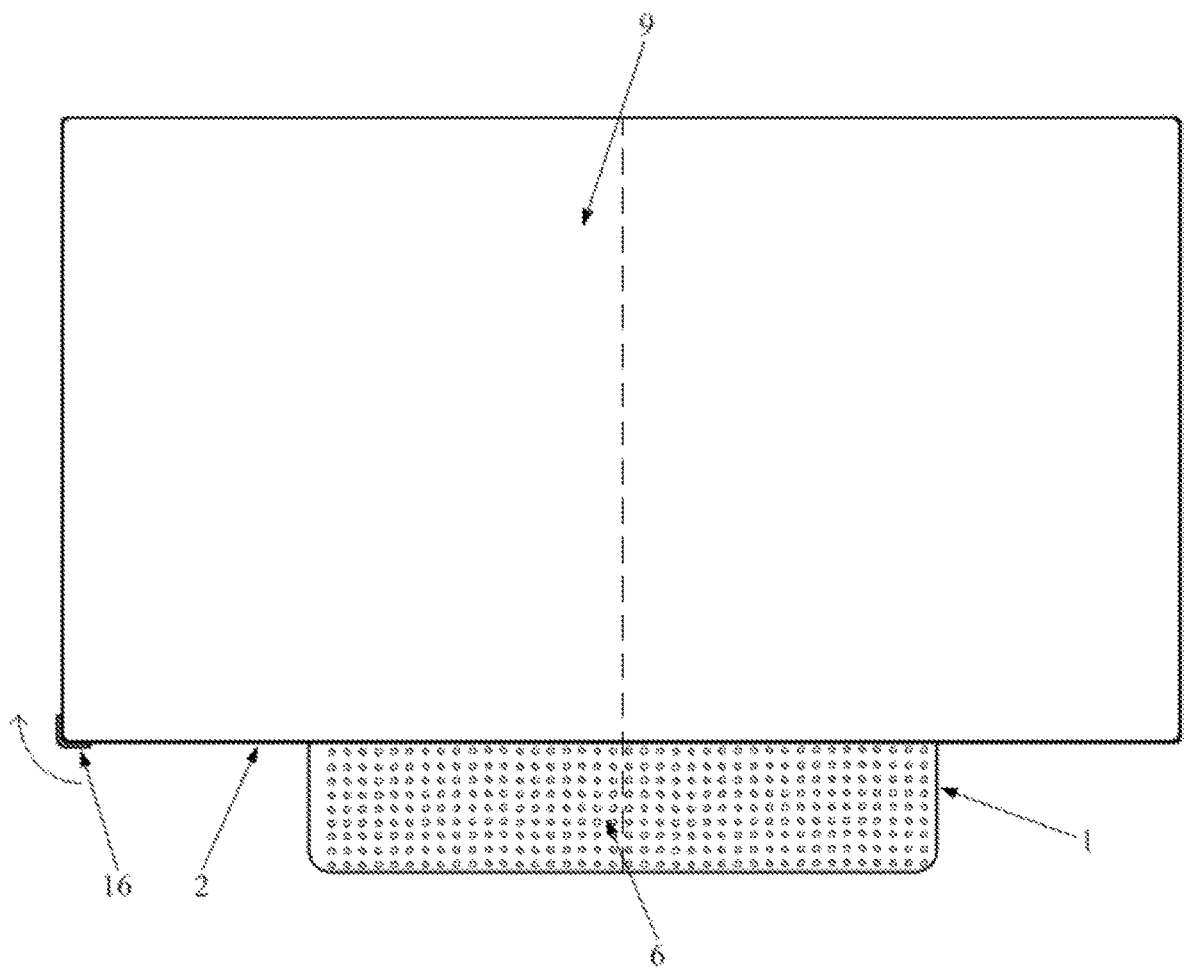
FIG. 1 is a front view of an exemplary electronic apparatus in a first attitude according to some embodiments of the present disclosure.

Numerals in drawings include: 1—first body, 2—second body, 3—connector, 4—first side, 5—second side, 6—first input/output device, 7—third side, 8—fourth side, 9—second input/output device, 10—first strip groove, 11—second strip groove, 12—first connecting member, 13—second connecting member, 14—straight groove section, 15—curved groove section, 16—marker, 17—support mechanism, 18—storage space, 19—third input/output device, 20—flange, 21—wire harness structure, 22—enclosure, 23—locking member, 24—elastic member, 25—mounting member, 26—operation member, 27—transmission member, 28—oblique edge, 29—wire management component, 30—wire port, 31—wires, and 32—base.

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure. In addition, under circumstances of no conflict, the embodiments and the features in the embodiments may be combined with each other.

In the following description, many details are explained in order to fully comprehend the present disclosure. However, the present disclosure can also be implemented in other ways different from those described herein. Those skilled in the art may do so without departing from the scope of the present disclosure. Therefore, the present disclosure is not limited by the embodiments described below.

Unless other defines, the technical and scientific terms used in the specification shall have the usual meanings understood by those with ordinary skills in the art to which this application belongs. The "first," "second," and similar words used in the specification do not denote any order, quantity or importance, but are only used to distinguish different components. "Include," "contain," and other similar words mean that an element or an item appearing before the word covers elements or items listed after the word and the equivalent thereof, but does not exclude other elements or items. "Connected," "attached," and other similar words are limited to physical or mechanical connections, but may include electrical connections directly or indirectly. "Up," "down," "left," and "right", etc. are only used to indicate a relative position relationship. After an absolute position of a described object changes, the relative position relationship may also change accordingly.

To keep the following description of the embodiments of the present disclosure clear and concise, detailed descriptions of known functions and known components are omitted.

The present disclosure provides an electronic apparatus. The electronic apparatus has more operation attitudes to substantially satisfy more diversified operation requirements of users.

As shown in FIGS. 1-20, the present disclosure provides an electronic apparatus. The electronic apparatus needs to support itself when in operation. For example, the electronic apparatus may be a display, an all-in-one computer, or a television set. The electronic apparatus includes a first body 1, a second body 2, and a connector 3. The first body 1 includes a first side 4 and a second side 5, arranged opposite to each other. A first input/output device 6 is disposed at the first side 4. The first input/output device 6 includes an input component (e.g., a touchpad, drawing board, and a keyboard, etc.) for inputting information to the electronic apparatus, an output component (e.g., a speaker, and a display screen, etc.) for outputting information from the electronic apparatus, or an input/output component (e.g., a touch screen) for both inputting and outputting information. In other words, the first input/output device 6 is an input and/or output device. The same is true for a second input/output device 9.

The second body 2 also includes a third side 7 and a fourth side 8, arranged opposite to each other. A second input/output device 9 is disposed at the third side 7. The second body 2 is disposed at the first body 1 through the connector 3. That is, the first body 1 provides at least a supporting function to support the second body 2. The connector 3 is disposed between the first body 1 and the second body 2 and more specifically between the first side 4 of the first body 1 and the fourth side 8 of the second body 2. That is, the connector 3 connects with a side of the first body 1 including the first input/output device 6 and a side of the second body 2 opposite to a side including the second input/output device 9. The connector 3 further facilitates the second body 2 that is connected to the first body 1 to rotate relative to the first body 1.

During this rotation, orientations of the first side 4 and the third side 7 always substantially satisfy a same condition, which means that the orientations of the first side 4 and the third side 7 are the same or the orientations of the first side 4 and the third side 7 are approximately the same (i.e., the orientations of the first side 4 and the third side 7 form a small angle, for example, between 0° and 5°). In other words, connecting with the first body 1 through the connector 3 not only makes the first side 4 and the third side 7 substantially satisfy the same condition before the second body 2 rotates, but also makes the first side 4 and the third side 7 substantially satisfy the same condition during and after the rotation of the second body 2.

Because the orientation of the side of the first body 1 and the orientation of the side of the second body 2 substantially satisfy the same condition during the rotation, the second body 2 rotates in a plane parallel with the first side 4 and the third side 7. That is, the rotation of the second body 2 relative to the first body 1 is a plane rotation. When the second input/output device 9 disposed at the second body 2 is a display screen or a touch screen (the display screen and the touch screen are collectively referred to as the screen in the specification), the rotation of the second body 2 facilitates the plane rotation of the screen, such that the electronic apparatus can have a variety of attitudes having the screen being placed at different angles, such as a first attitude having the screen being placed horizontally (i.e., landscape mode) and a second attitude having the screen being placed vertically (i.e., portrait mode).

Because the second body 2 can rotate in the plane, the rotation of the second body 2 facilitates the electronic apparatus to switch between the first attitude and the second attitude. When the electronic apparatus is placed in the first attitude, the second body 2 does not block the first input/output device 6 disposed at the first side 4. When the electronic apparatus is placed in the second attitude, the second body 2 does not block the first input/output device 6 disposed at the first side 4 either. That is, regardless of the electronic apparatus being in the first attitude or the second attitude, the second body 2 does not affect normal operation (or interaction) of the first input/output device 6.

Specifically, when the first input/output device 6 is a speaker, the second body 2 does not block the speaker in a sound wave output direction, thereby avoiding degrading sound effect of the speaker, such as making sound dull or low volume. When the first input/output device 6 is a display, the second body 2 does not block the display in a displaying direction, thereby preventing a user from not being able to fully view the display screen and avoiding compromising user's perception or collection of user information.

In the above-described structure, because the second input/output device 9 disposed at the second body 2 is often the screen, the second body 2 may be the display of the electronic apparatus. As such, the second body 2 is often a plate-shaped display. The third side 7 and the fourth side 8 are the two largest surface areas of the second body 2. The first body 1 may have a variety of three-dimensional shapes. For example, the first body 1 is plate-shaped, and the first side 4 and the second side 5 are the two largest surface areas. In another example, the first body 1 is block-shaped, and has a large volume and a large contact area with a desktop, such as a cube, a trapezoid block (i.e., a block having a vertical cross section in a trapezoid shape), or a frustum, etc.

In the electronic apparatus having the above-described structure, the connector 3 disposed between the first body 1 and the second body 2 facilitates the second body 2 that is supported by the first body 1 to rotate relative to the first body 1 in the plane. As such, the screen of the electronic apparatus may be placed in a variety of operation attitudes such as the first attitude and the second attitude within the same plane, that is, may be switched at least between the landscape mode and the portrait mode. Further, the screen may display a suitable image according to the landscape mode or the portrait mode. For example, in the portrait mode, the screen may display a vertical image collected or projected by a mobile phone, thereby substantially satisfying user's diversified requirements. Further, in the first attitude or the second attitude, the second body 2 does not block the first input/output device 6. Thus, the first input/output device 6 operates normally regardless of whether the electronic apparatus is in the first attitude or the second attitude, thereby improving user experience of the electronic apparatus.

In the electronic apparatus having the above-described structure, as shown in FIGS. 1-6, a viewable appearance can be described in the following. The second body 2 is rotatably disposed at the first body 1 through the connector 3. The connector 3, that is disposed between the first body 1 and the second body 2, is blocked by the first body 1 in a first direction, and is blocked by the second body 2 in a second direction. The first direction is opposite to the second direction. Specifically, the first direction is a direction in which the user views the electronic apparatus when facing toward the second side 5 and the fourth side 8, and the second direction is a direction in which the user views the electronic apparatus when facing toward the first side 4 and the third side 7.

In some embodiments, the first body 1 may include a motherboard, and the second body 2 may include a display. At the same time that the display switches between the landscape mode and the portrait mode, the connector 3 is concealed from the front and the back of the electronic apparatus, thereby improving an aesthetic appearance of the electronic apparatus. In some other embodiments, the second body 2 may include the motherboard and the display, and the first body 1 only provides support to the second body 2 to adjust a height and/or an angle of the second body 2.

Figure 4:
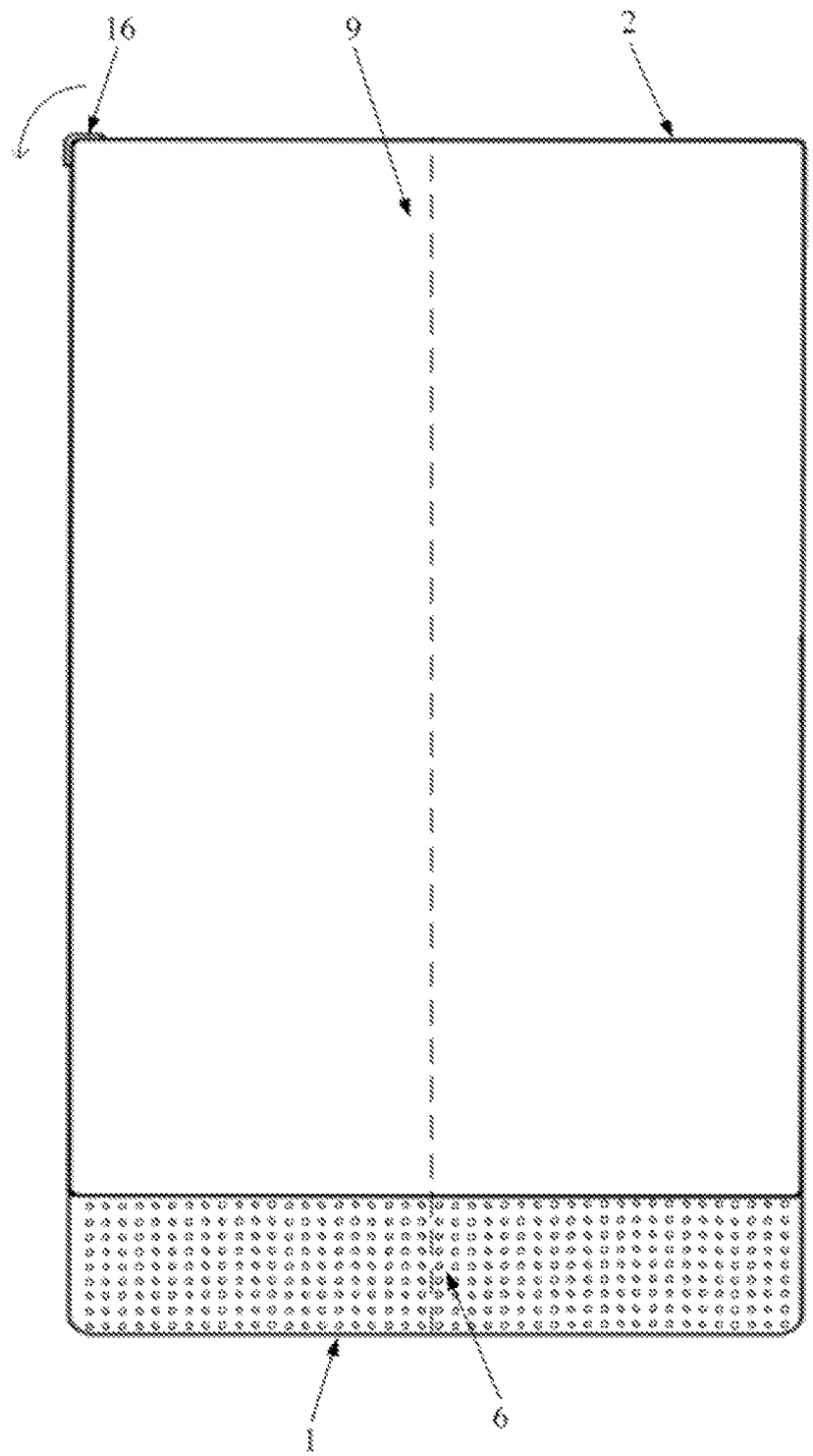
FIG. 4 is a front view of an exemplary electronic apparatus in a second attitude according to some embodiments of the present disclosure.

As shown in FIG. 1 and FIG. 4, the third side 7 of the second body 2 is rectangular-shaped. This is because the second input/output device 9, as a primary information output component of the electronic apparatus, is disposed at the third side 7. In some embodiments, the second input/output device 9 is the screen. That is, the third side 7 is a display side of the screen of the electronic apparatus. Thus, the second body 2 including the third side 7 is the display of the electronic apparatus (e.g., the entire electronic apparatus is a television set or an all-in-one computer). The rectangular-shaped display side allows switching between the landscape mode and the portrait mode. A square-shaped display side makes no distinction between the landscape mode and the portrait mode because both are the same. Thus, the electronic apparatus is ensured to has different attitudes.

In some embodiments, the second body 2 in the first attitude and the second body 2 in the second attitude substantially satisfy a vertical condition. In the present disclosure, the variety of attitudes of the electronic apparatus obtained through the rotation of the second body 2 at least include the first attitude and the second attitude. A relative position relationship between the second bodies 2 in the two attitudes substantially satisfies the vertical condition. In some embodiments, the relative position relationship is perpendicular to each other. That is, the second body 2 in the first attitude is perpendicular to the second body 2 in the second attitude.

Figure 2:
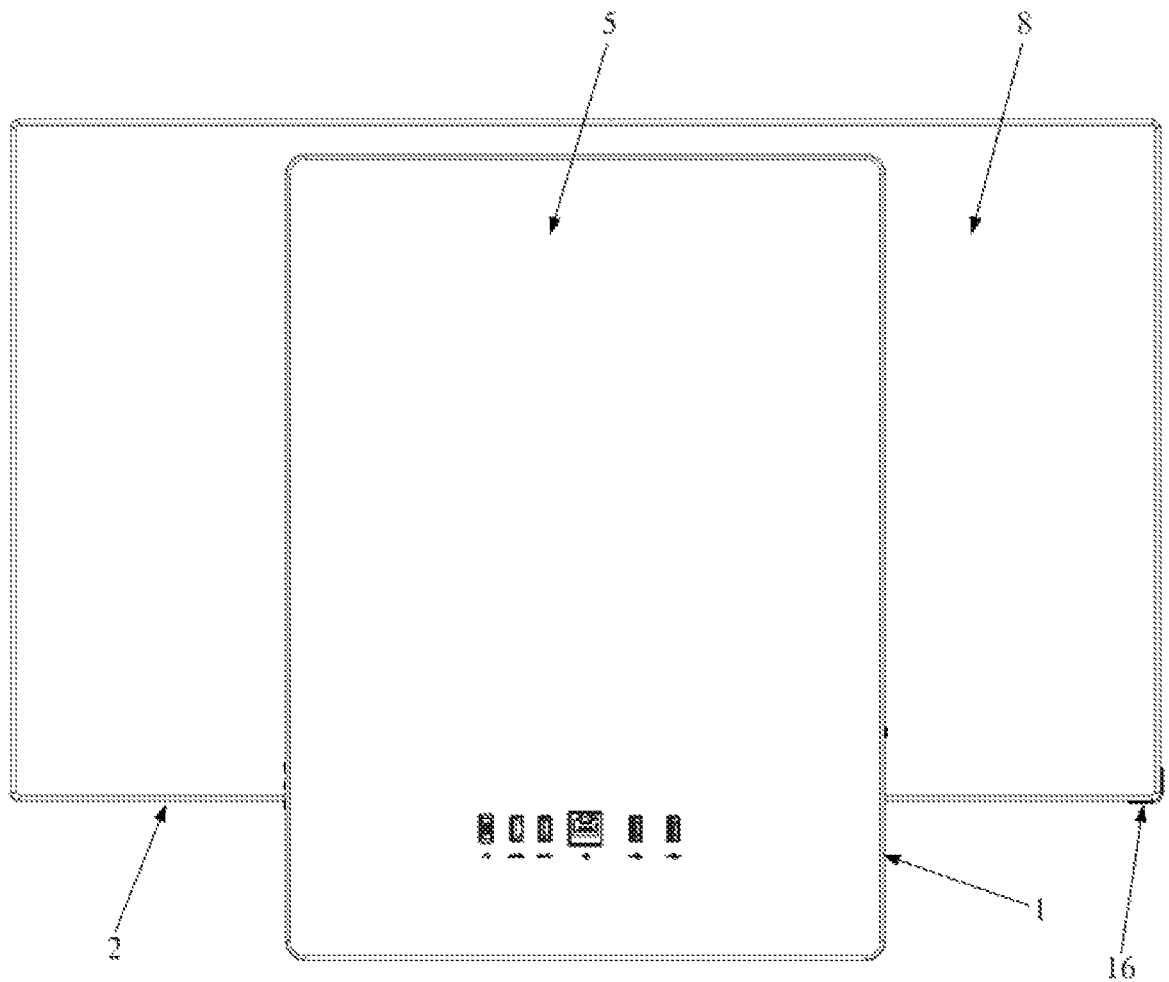
FIG. 2 is a rear view of an exemplary electronic apparatus in the first attitude according to some embodiments of the present disclosure.
Figure 3:
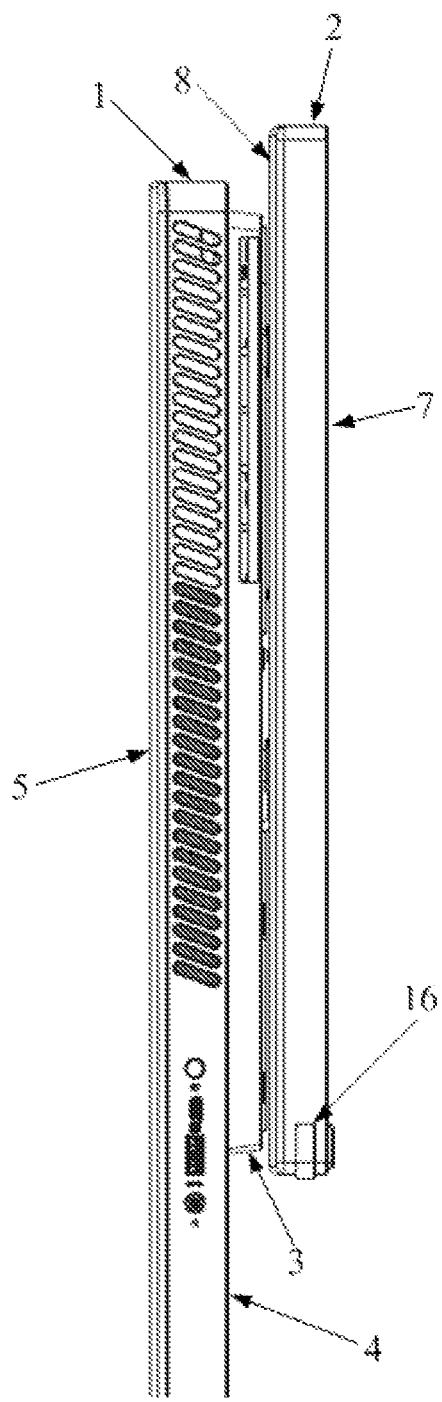
FIG. 3 is a side view of an exemplary electronic apparatus at the first attitude according to some embodiments of the present disclosure.
Figure 5:
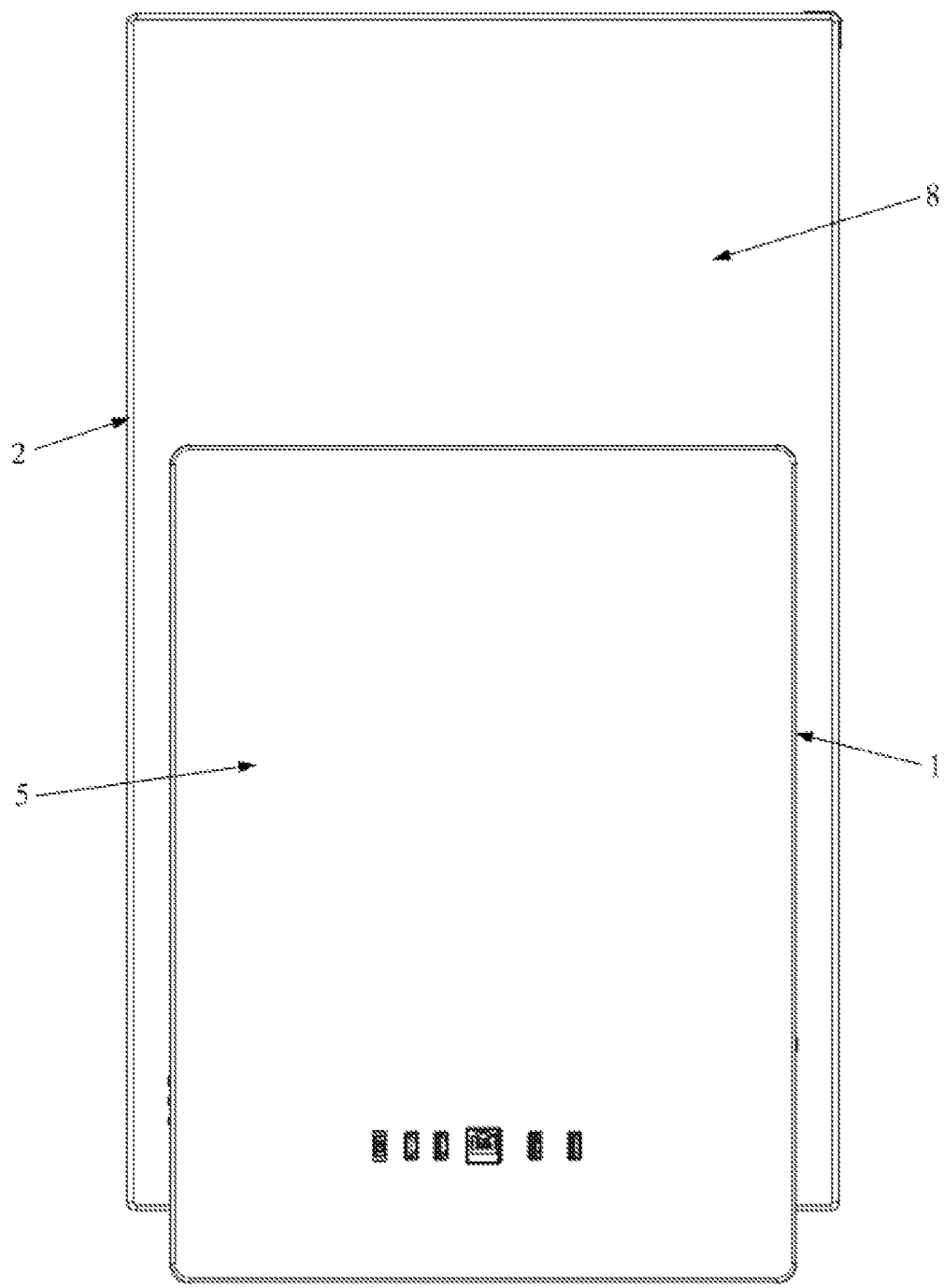
FIG. 5 is a rear view of an exemplary electronic apparatus in the second attitude according to some embodiments of the present disclosure.
Figure 6:
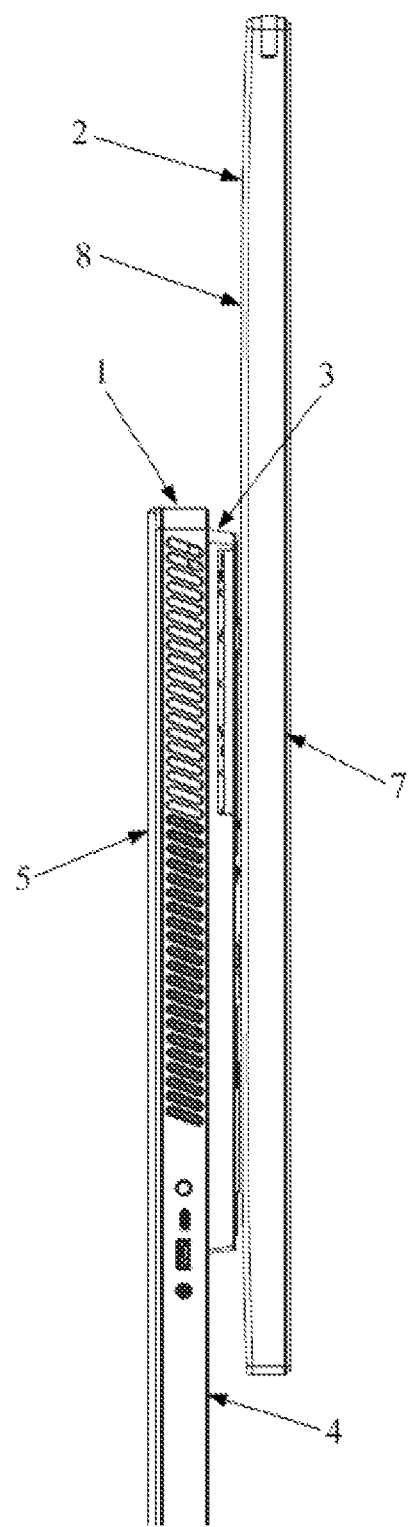
FIG. 6 is a side view of an exemplary electronic apparatus in the second attitude according to some embodiments of the present disclosure.

In some embodiments, the second body 2 in the first attitude is in the landscape mode. As shown in FIGS. 1-3, a long edge of the display is placed horizontally. The second body 2 in the second attitude is in the portrait mode. As shown in FIGS. 4-6, a long edge of the display is placed vertically. The horizontally placed long edge is perpendicular to the vertically placed long edge. The rotation of the second body 2 between the two attitudes is 90°. That is, a maximum angle in which the second body 2 rotates relative to the first body 1 is greater than or equal to 90°. When the electronic apparatus is placed in the first attitude or the landscape mode, the user may use the electronic apparatus to view images and perform office work. When the electronic apparatus is placed in the second attitude or the portrait mode, the user may use the electronic apparatus to read books, browse news pages, edit portrait images, and watch portrait mode streaming media contents (e.g., short videos).

In some embodiments, the first input/output device 6 and the second input/output device 9 may be different types. For example, when the second input/output device 9 is the screen, the first input/output device 6 is the speaker. That is, one is used to output videos, and the other is used to output audios. In some embodiments, the first input/output device 6 and the second input/output device 9 may be the same type. For example, when the second input/output device 9 is the screen having a large display area, the first input/output device 6 is the screen having a small display area. Both screens display contents at the same time. In this case, the display function of the electronic apparatus is enhanced. In some other embodiments, both screens may display contents at different time to reduce a power consumption of the electronic apparatus. For example, the large screen is turned off and the small screen is turned on.

In addition, in the first attitude and the second attitude, a center line of the third side 7 and a center line of the first side 4 substantially satisfy a coincidence condition. The center lines are center lines that substantially satisfy the vertical condition with a load bearing surface for load bearing the electronic apparatus. Dashed lines in FIG. 1 and FIG. 4 are the center lines. Because the center lines substantially satisfy the coincidence condition, each dashed line represents both the center line of the third side 7 and the center line of the first side 4.

Specifically, when the electronic apparatus is in a normal placement, that is, the electronic apparatus is operationally placed at the desktop, the first body 1 stands vertically, and the first side 4 is a vertical surface or a surface forming a small angle with the vertical surface. The vertical surface includes a center line. The center line is a line connecting between two center points of two opposing edges. An orthogonal projection of the center line on the vertical surface is a vertical line. Similarly, the third side 7 also includes center lines. When the electronic apparatus is in the first attitude, an orthogonal projection of a first center line of the third side 7 on the vertical surface is a first vertical line. The first center line refers to a line connecting between center points of two long edges of the rectangular-shaped third side 7, as shown in FIG. 1. The projected vertical line of the first side 4 and the projected first vertical line of the third side 7 substantially satisfy the coincidence condition. The coincidence condition refers to that the two projected vertical lines coincide with each other completely or form a small angle between each other.

After the electronic apparatus switches from the first attitude to the second attitude, an orthogonal projection of a second center line of the third side 7 on the vertical surface is a second vertical line. The second center line refers to a line connecting between center points of two short edges of the rectangular-shaped third side 7, as shown in FIG. 4. The projected vertical line of the first side 4 and the projected second vertical line of the third side 7 substantially satisfy the coincidence condition. In other words, regardless of whether the second body 2 is in the landscape mode or the portrait mode, two side portions of the second body 2 are symmetrical with reference to the center line of the first side 4. Further, regardless of whether the electronic apparatus is in the first attitude or the second attitude, the first body 1 is located at a center position of the third side 7 in a horizontal direction. In other words, protruding areas of the third side 7 on the left and right sides of the first body 1 are equal, as shown in FIG. 1 and FIG. 4. Thus, the electronic apparatus is supported stably and shows an aesthetically desirable appearance.

In some embodiments, as shown in FIG. 1 and FIG. 4, when the electronic apparatus is in the first attitude, an area of an orthogonal projection of the third side 7 on the first side 4 and an area occupied by the first input/output device 6 substantially satisfy a first position relationship. When the electronic apparatus is in the second attitude, the area of the orthogonal projection of the third side 7 on the first side 4 and the area occupied by the first input/output device 6 also substantially satisfy the first position relationship. In other words, regardless of whether the electronic apparatus is in the first attitude or the second attitude, the projected area and the area occupied by the first input/output device 6 maintain a consistent relative position relationship. The projected areas in both attitudes are located in a same direction of the occupied area and at a same distance from the occupied area. For example, the projected areas in both attitudes are both located above the occupied area and at a first distance from the occupied area. In this case, positions of the second body 2 before and after the rotation do not change relative to a position of the second input/output device 9. Thus, a change in the attitude of the electronic deice does not affect the second input/output device 9.

In the first attitude and the second attitude, the third side 7 is partially projected on the first side 4. That is, the third side 7 in the first attitude and the second attitude includes a portion extending beyond the first side 4. For example, the area of the third side 7 is greater than or equal to the area of the first side 4. In some embodiments, the third side 7 and the first side 4 have an equal width, but the third side 7 has a length greater than that of the first side 4. In this case, because the length of the third side 7 is greater than the length of the first side 4, the third side 7 in the landscape mode extends to the left and the right beyond the first side 4, and the third side 7 in the portrait mode extends to the top beyond the first side 4. In some other embodiments, both the width and the length of the third side 7 are greater than the width and the length of the first side 4, respectively. In this case, because the length of the third side 7 is greater than the length of the first side 4, the third side 7 in the landscape mode extends to the left and the right beyond the first side 4, and the third side 7 in the portrait mode extends to the top in addition to the left and the right beyond the first side 4.

In some embodiments, the first position relationship is an adjacency relationship. That is, in the first attitude and the second attitude, the projected area is adjacent to the area occupied by the first input/output device 6, and no gap exists between the projected area and the occupied area. The first distance is zero. The projected area is always located above the occupied area. In other words, the projected area and the occupied area divide the first side 4 consistently. The projected area is always located at the top and the occupied area is always located at the bottom. The projected area and the occupied area always divide the first side 4 at a same ratio, for example, 8:2.

In some embodiments, the connector 3 facilitates the second body 2 to rotate relative to the first body 1 through a connecting member that connects between the first body 1 and the second body 2. The connecting member rotates and moves relative to the first body 1 to switch the electronic apparatus between the first attitude and the second attitude. The connector 3 may include a plurality of connecting members. A plurality of slideways extending toward different directions may be configured at the first body 1. Each connecting member is rotatably connected to one of the plurality of slideways and is able to slide in the connected slideway.

In some embodiments, a rod-shaped connecting member is configured at the first side 4. One end of the rod-shaped connecting member is rotatably or fixedly connected to the fourth side 8 of the second body 2. When the connecting member is rotatably connected to the second body 2, the connecting member can only rotate around its own axis, and cannot change its position relative to the second body 2. This is also true when the connecting member rotates in the slideway. Another end of the rod-shaped connecting member extends into the slideway, is connected to the slideway, and is able to move and rotate in the slideway. When the second body 2 rotates, the connecting member that is connected to the second body 2 is driven by the second body 2 to rotate, thereby achieving rotation and movement in the slideway.

When the connecting member engages with the slideway, each of the plurality of connecting members corresponds to each of the plurality of slideways. That is, only one connecting member moves and rotates in each slideway. In some embodiments, two or more slideways corresponding to two or more connecting members may be configured. In some embodiments, two slideways corresponding to two connecting members are configured. More slideways and more connecting members spread forces applied to the first body 1 more evenly, make the connection between the first body 1 and the second body 2 more secure, and make the second body 2 rotate more smoothly. However, a structure of the two slideways and the two connecting members engaged with each other is sufficient for stabilizing the rotation of the second body 2 relative to the first body 1 and preventing the second body 2 from shaking relative to the first body 1. While the connection is secured and the rotation is smoothed, the structure of the connector 3 is also simplified to certain extent.

Further, when there are only two connecting structures, a distance between the two connecting structures can be increased to maximum extent. That is, connecting points are spread out in a support plane as much as possible, and different connecting members move in different directions and different trajectories to maximize connection reliability and rotation stability of the second body 2. As such, the user may use only one hand to rotate the second body 2 to effortlessly change the attitude of the electronic apparatus.

In some embodiments, as shown in FIGS. 7-11, slideways are strip grooves configured at the first body 1 and include a first strip groove 10 and a second strip groove 11. Dashed lines in the drawings are trajectories of the connecting members being moved. The connecting members include a first connecting member 12 and a second connecting member 13 rotatably and slidably configured in the first strip groove 10 and the second strip groove 11, respectively. The first strip groove 10 is a straight strip groove having a straight extension trajectory parallel with the center line (i.e., the center line of the first side 4). When the electronic apparatus switches from the first attitude to the second attitude, the first connecting member 12 makes one reciprocating movement in the first strip groove 10. The second strip groove 11 includes a straight strip groove section 14 having a straight extension trajectory and a curved strip groove section 15 having a curved extension trajectory. The straight strip groove section 14 is tilted with reference to the center line to provide the straight strip groove section 14 with two ends having different heights, and a higher end of the straight strip groove section is a first end. One end of the curved strip groove section 15 is located at the first end of the straight strip groove section 14. Another end of the curved strip groove section 15 is away from the first end of the straight strip groove section 14, and has a height smaller than the height of the first end of the straight strip groove section 14. When the electronic apparatus switches from the first attitude to the second attitude, the second connecting member 13 makes one reciprocating movement in a direction parallel with the center line.

Figure 7:
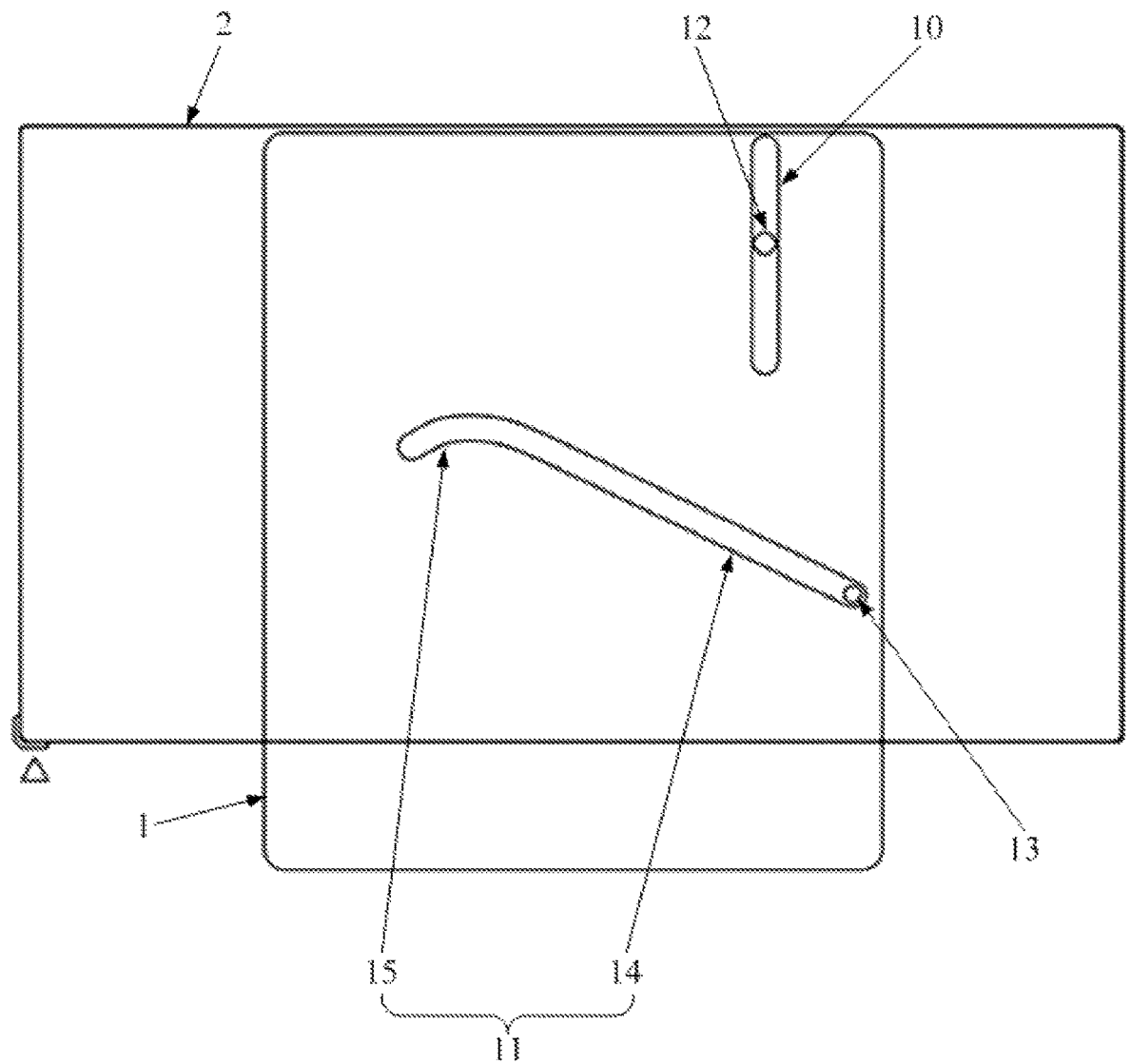
FIGS. 7-11 are schematic diagrams illustrating a second body at different angles when an exemplary electronic apparatus changes from the first attitude to the second attitude according to some embodiments of the present disclosure.
Figure 8:
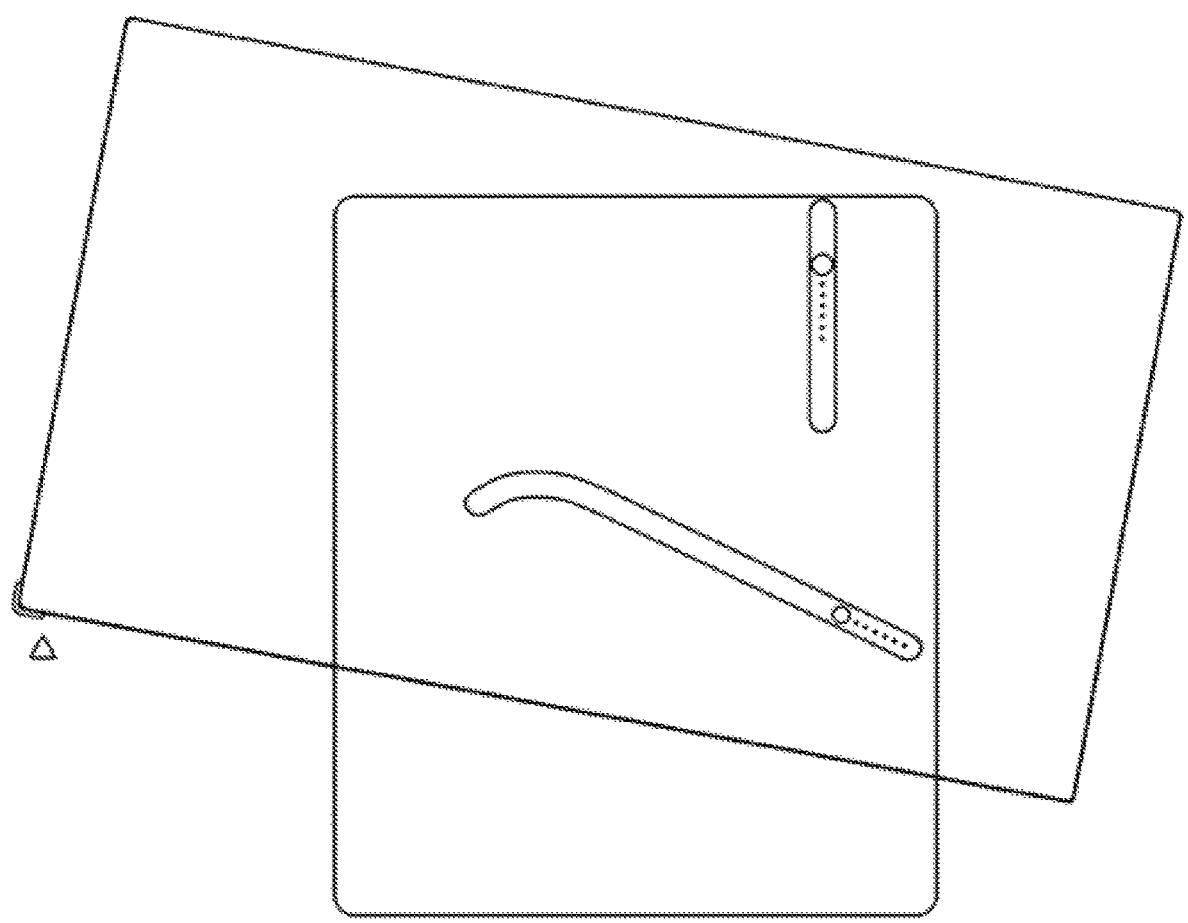
Figure 9:
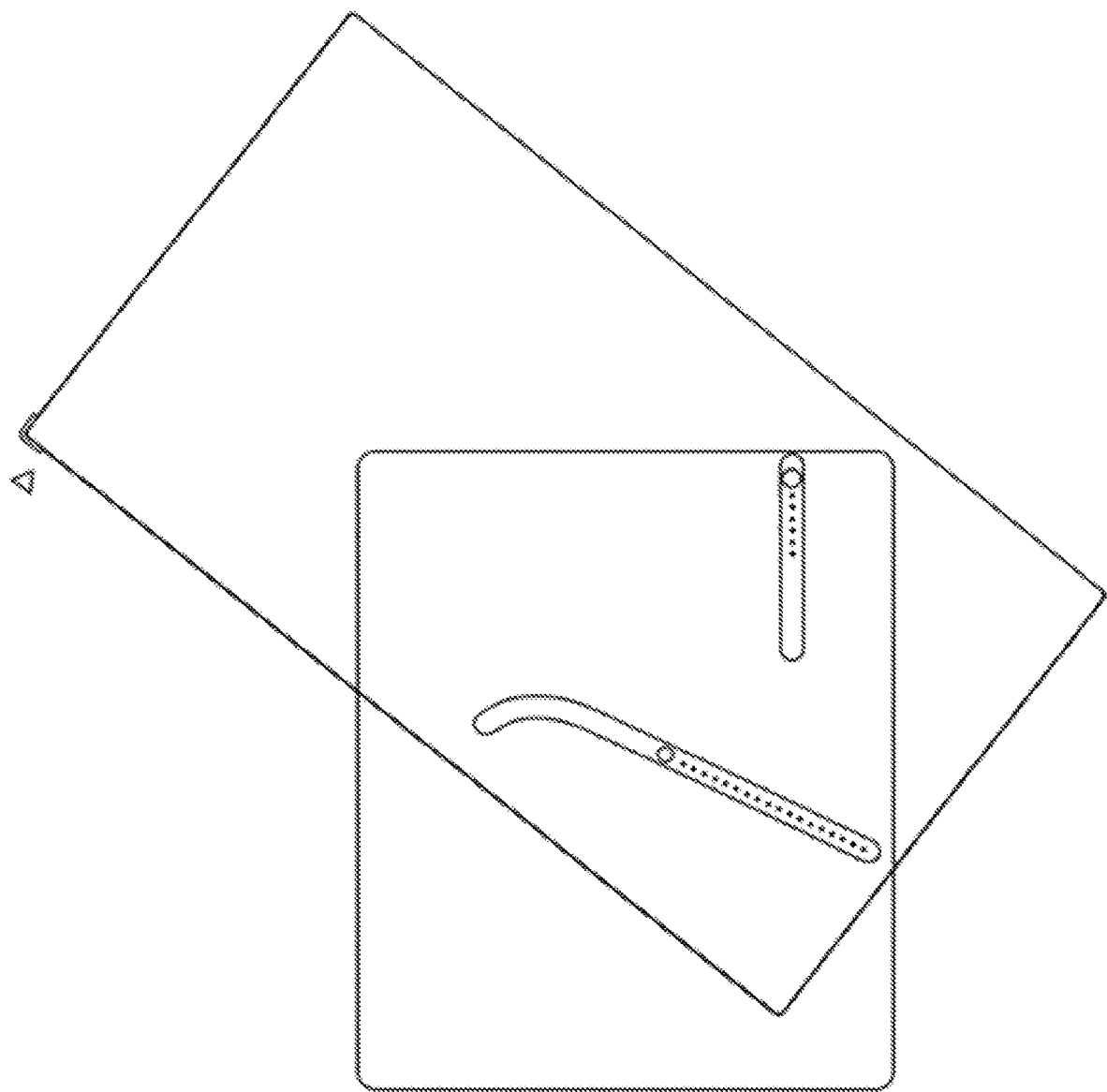
Figure 10:
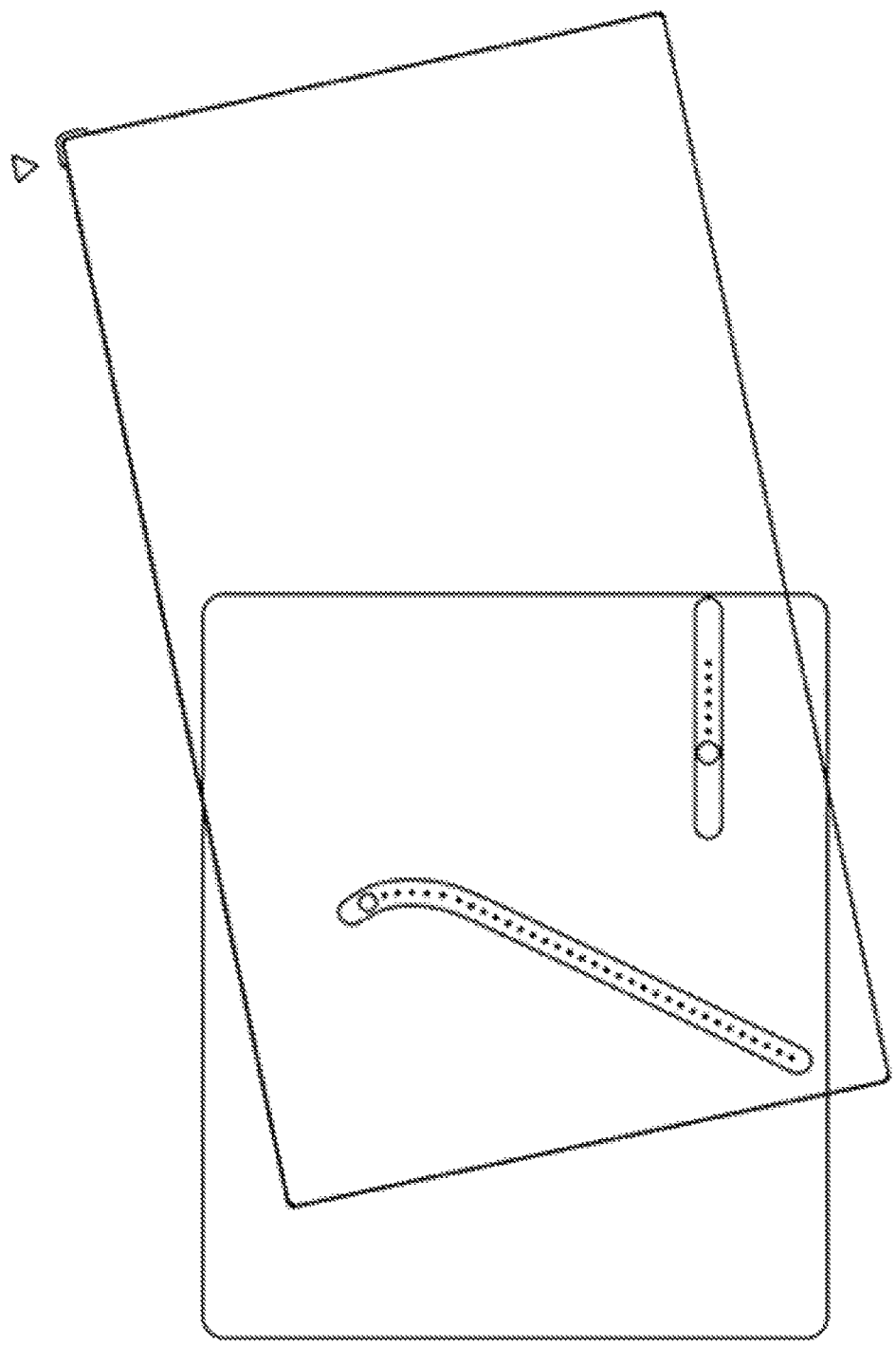

In some embodiments, a non-linear movement of the connecting member in the strip groove facilitates a smooth rotation of the second body 2 at no less than 90°. For example, when the second body 2 is in the landscape mode, as shown in FIG. 7, the first connecting member 12 is located at a position adjacent to a center point of the first strip groove 10. The second connecting member 13 is located at the end of the straight strip groove section 14 having the smaller height. As shown in FIG. 8 and FIG. 9, when the user applies a force on the second body 2 to rotate the second body 2 from the landscape mode to the portrait mode, the first connecting member 12 is driven by the force applied by the user to move upward and downward to gradually approach the top end of the first strip groove 10, and the second connecting member 13 is driven to gradually approach the first end of the straight strip groove section 14 having the greater height.

When the first connecting member 12 and the second connecting member 13 are moving, because the first strip groove 10 extends vertically and the straight strip groove section 14 is tilted with reference to the center line, the second body 2 is driven by a vertical upward movement of the first connecting member 12 and a tilted upward movement of the second connecting member 13 to rotate relative to the first body 1. During the rotation of the second body 2, the second body 2 simultaneously moves upward. After the first connecting member 12 moves to the top end of the first strip groove 10, the second connecting member 13 approaches the first end of the straight strip groove section 14 through the tilted upward movement.

At this point, the upward movement of the second body 2 reaches a limit position relative to the first body 1 (the second body 2 moves downward relative to the first body 1 subsequently), and a rotation angle of the second body 2 is smaller than 90°. The second body 2 continues to rotate. That is, the first connecting member 12 is driven by the force applied by the user to turn around and move downward, and the second connecting member 13 continues to approach the first end and enters the curved strip groove section 15. That is, at the beginning of the downward movement of the first connecting member 12, the second connecting member 13 continues its tilted upward movement. As such, the second body 2 continues to rotate.

Figure 11:
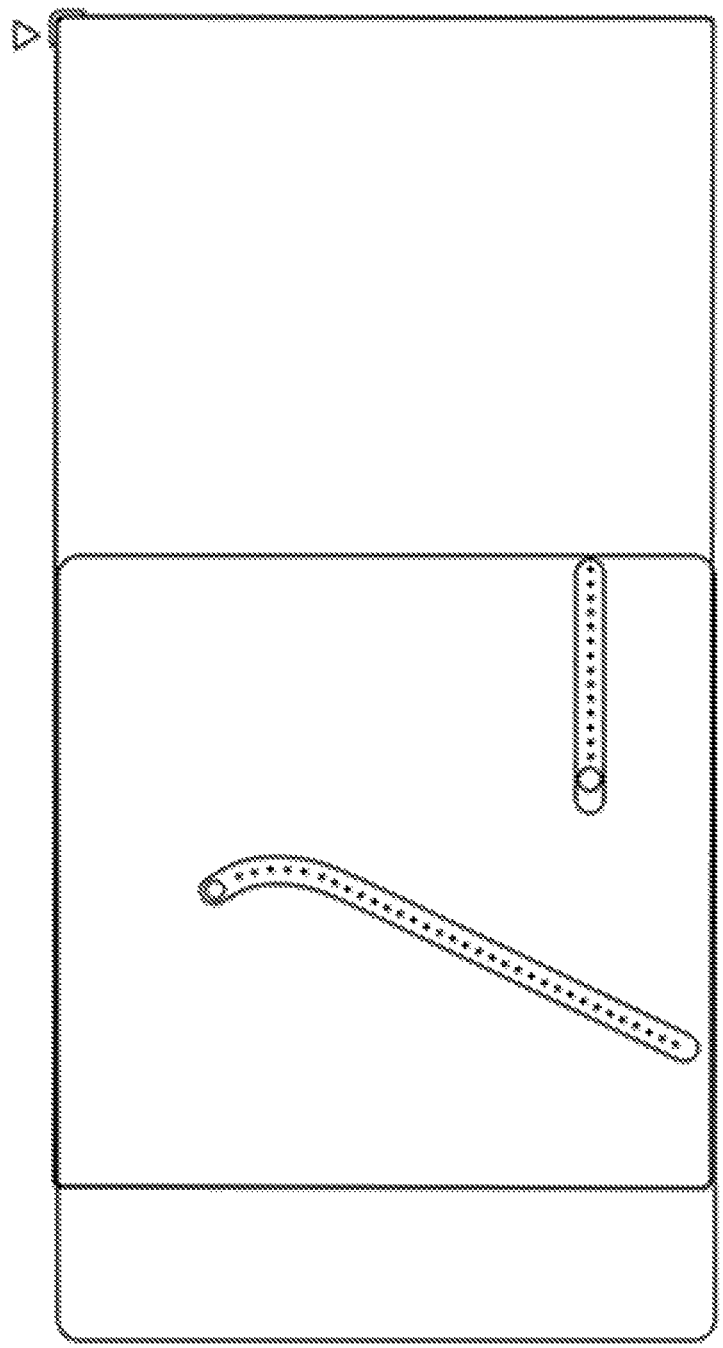

After the second connecting member 13 moves to a position where a curvature of the curved strip groove section 15 is the largest, because the position is the highest position of the entire second strip groove 11, the subsequent movement of the second connecting member 13 becomes a tilted downward movement (moving away from the first strip groove 10). When the second connecting member 13 changes the movement direction, as shown in FIG. 11, the first connecting member 12 maintains its vertical downward movement. At this point, the rotation angle of the second body 2 approaches 90°. As the user continues to push, the second body 2 is guided by the curved strip groove section 15 to rotate exactly 90°. The user's push is approximately in the horizontal direction. Because the first connecting member 12 and the second connecting member 13 move downward, the gravity of the second body 2 primarily drives the rotation until the rotation angle reaches 90°. At this point, as shown in FIG. 11, the first connecting member 12 is located at a bottom end of the first strip groove 10, and the second connecting member 13 is located at an end of the curved strip groove section 15 away from the straight strip groove section 14. The second body 2 stops its rotation at a position where further rotation is blocked by the first strip groove 10 and the second strip groove 11. At this point, the second body 2 is in the portrait mode as shown in FIG. 6 and FIG. 11.

During the rotation, the first strip groove 10 guides a rise and a fall of the second body 2. The first connecting member 12 makes one reciprocating movement both in the direction parallel with the center line and in the first strip groove 10. The second strip groove 11 guides the rotation of the second body 2. The second connecting member 13 makes a unidirectional movement in the second strip groove 11 and makes one reciprocating movement in the direction parallel with the center line. In the embodiments of the present disclosure, the strip grooves are used to provide slideway function because the strip grooves can be easily formed at the manufacture. Further, the strip grooves are more effective in aligning, guiding, and restraining the connecting members, such that the connecting members can move more accurately and effectively at the first side 4 according to pre-determined extension trajectories (i.e., the trajectories formed by the strip grooves). In some other embodiments, the slideways may be other structures, such as chutes and guide rails, etc.

In some embodiments, as shown in FIGS. 7-11, the connector 3 makes the second body 2 unidirectionally rotate relative to the first body 1 to switch from the first attitude to the second attitude. That is, the second body 2 rotates clockwise or counterclockwise by an angle (the angle is no smaller than 90°, such as 90°, 100°, and 120°, etc.) The second body 2 is not allowed to rotate 360° in a full cycle to change from the first attitude to the second attitude, and from the second attitude back to the first attitude. As such, the structures of the slideways are simple and the rotation of the second body 2 is stable.

In some embodiments, as shown in FIGS. 1-11, a marker 16 is disposed at a force receiving position of the second body 2. The force receiving position is configured to receive a rotatory force exerted on the second body 2 to allow a switch from the first attitude to the second attitude. In some embodiments, the force receiving position is located at a corner position of the second body 2. For example, the marker 16 is disposed at a lower left corner as shown in FIG. 1. The marker position is located adjacent to a triangle mark in FIGS. 7-11. A sharp corner of the triangle mark points to a direction in which the user applies the force.

The marker 16 disposed at the force receiving position prompts the user where the user needs to apply the force to change the attitude of the electronic apparatus. As such, it is more convenient for the user to operate the electronic apparatus, thereby improving the user experience. In some embodiments, the marker 16 may be a plate-shaped member that is bent into a right-angle structure to better match the corner of the second body 2. The prompt function may be illustrated by color, material, surface texture, and touch feel, etc., which are obviously different from the second body 2. A surface of marker 16 may provide the prompt information. In some embodiments, the marker 16 may have a color obviously different from a color of the second body 2 to catch the user's attention. For example, the second body 2 is black, and the marker 16 is red.

In some embodiments, the surface of the marker 16 includes a pattern indicating a rotation direction. For example, two outer surfaces of the marker 16, that are perpendicular to each other, are configured with two arrows, respectively. The two arrows are pointing away from each other. When the second body 2 is in the landscape mode, because the user is more likely to see a sidewall of the short edge of the second body 2, the surface of a first part of the marker 16 on the sidewall of the short edge includes an arrow pointing downward. That is, the user is prompted to rotate the upper left corner of the second body 2 downward, as shown in FIG. 6. Thus, it is more convenient for the user to perform the operation to change the attitude.

Figure 12:
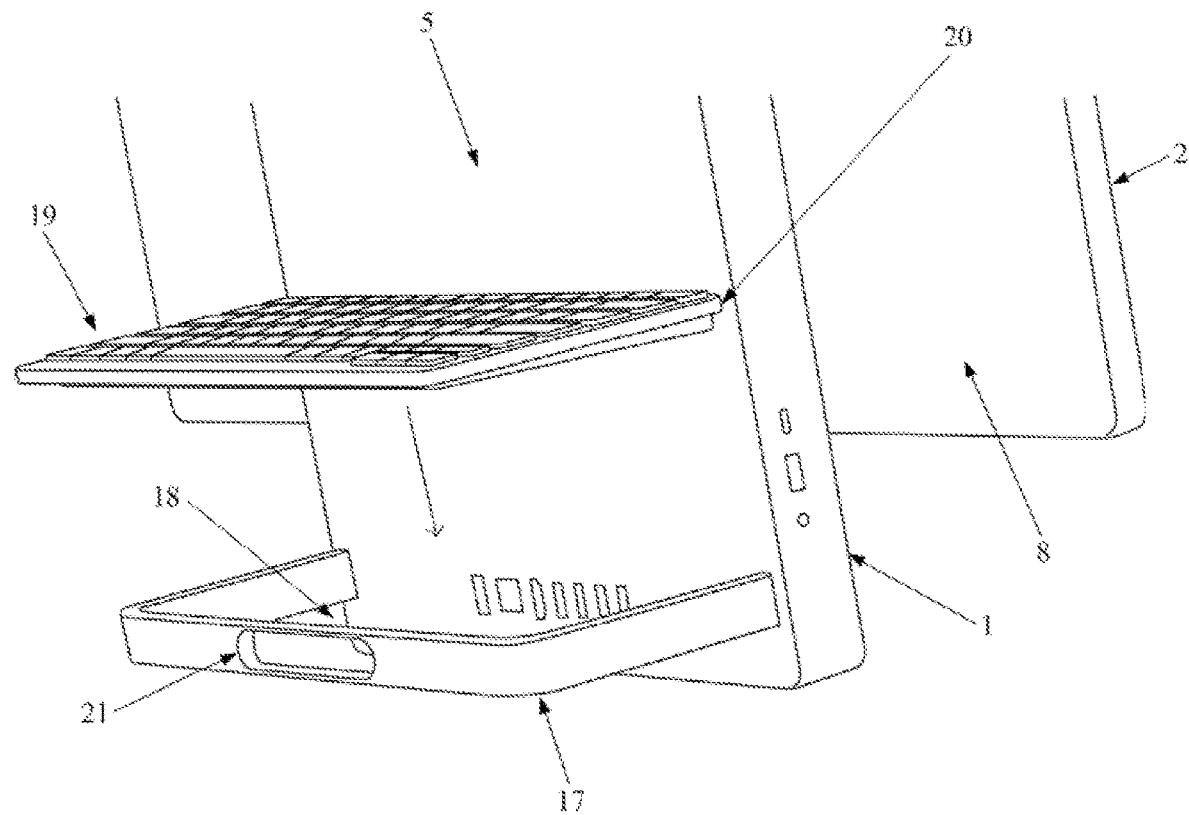
FIG. 12 is a schematic diagram illustrating a third input/output device being stored in a storage space according to some embodiments of the present disclosure.
Figure 13:
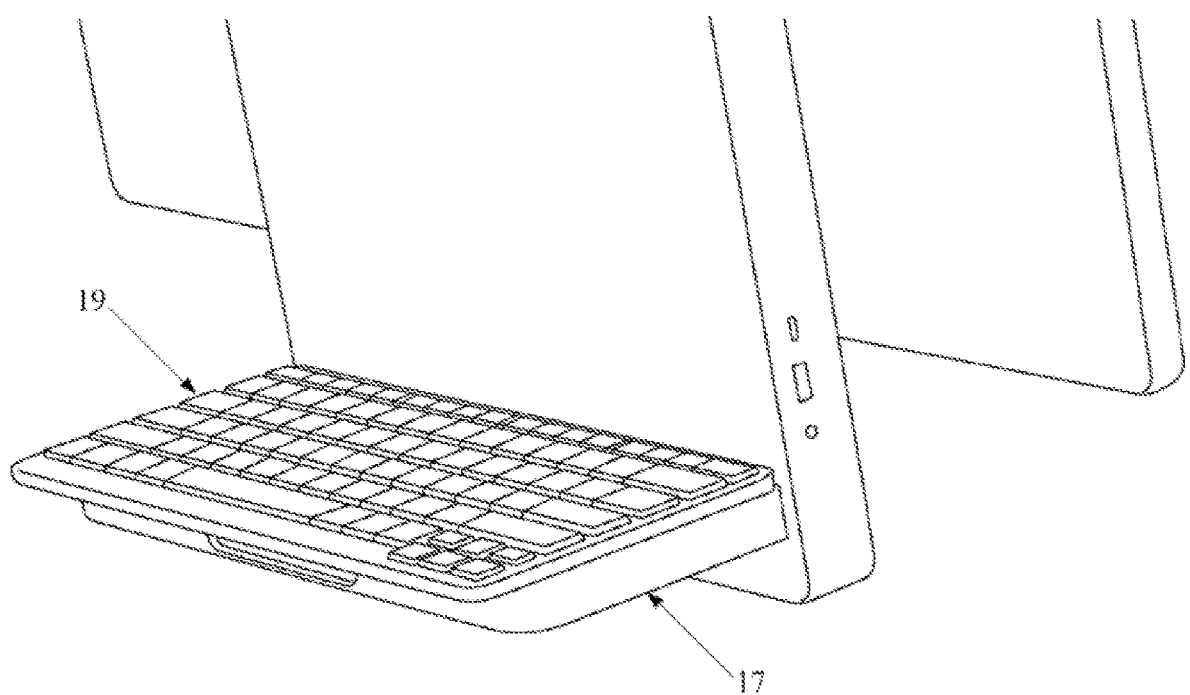
FIG. 13 is a schematic diagram illustrating the third input/output device being stored in the storage space according to some embodiments of the present disclosure.

In addition, as shown in FIG. 12 and FIG. 13, the second side 5 of the first body 1 includes a support mechanism 17. The support mechanism 17 is used to support the first body 1 and to form a storage space 18 for accommodating a third input/output device 19. The third input/output device 19 is used for data transmission with the electronic apparatus through a wired or wireless method.

The second side 5 of the first body 1 is located away from the second body 2. When the second input/output device 9 is the screen of the electronic apparatus, the second side 5 is the back of the electronic apparatus. In the existing technology, a keyboard is placed or stored at the front side of a computer, that is, a side where the third side faces toward the first body 1. This arrangement occupies a desktop space or makes the appearance of the front side of the electronic apparatus look unsightly.

In some embodiments, the support mechanism 17 is configured at the back of the electronic apparatus. The support mechanism 17 supports the first body 1 and at the same time forms the storage space 18 for accommodating the third input/output device 19. The third input/output device 19 is used for the data transmission with the electronic apparatus through the wired or wireless method. For example, the third input/put device 19 may be a keyboard or a mouse. Because the storage space 18 is located at the back of the electronic apparatus, the accommodating the third input/output device 19 in the storage space 18 not only accommodates the third input/output device 19 in the storage space 18, but also conceals the third input/output device 19 behind the first body 1. Thus, placing the third input/output device 19 at the front of the electronic apparatus is avoided, less desktop space is occupied, and the appearance of the front side of the electronic apparatus looks nice.

In some embodiments, a positioning structure may be configured at the support mechanism 17 and/or the third input/output device 19 to position the third input/output device 19 in the storage space 18. A wire harness structure 21 may be configured at the support mechanism 17 to harness wires 31. As shown in FIG. 12 and FIG. 13, the support mechanism 17 is frame-shaped, protrudes from the second side 5, and is slightly tilted toward the first body 1 relative to the second side 5. Thus, when standing on the desktop, the first body 1 is slightly tilted with respect to the desktop.

The storage space 18 is an inner space inside the frame-shaped support mechanism 17. The inner space may be completely enclosed by the frame-shaped support mechanism 17 (i.e., the frame-shaped support mechanism 17 is circumferentially closed) or may be enclosed by the frame-shaped support mechanism 17 together with the second side 5 (i.e., the frame-shaped support mechanism 17 has an opening that is closed by the second side 5). The positioning structure includes a flange 20 protruding around the third input/output device 19 and a bottom part of the third input/output device 19 located under the flange 20. As shown in FIG. 12, the flange 20 and the bottom part of the third input/output device 19 together form a stepped structure. When the third input/out device 19 is placed in the storage space 18, the flange 20 is overlaps a top surface of the frame-shaped support mechanism 17, and the bottom part of the third input/output device 19 sits inside the storage space 18. Thus, the frame-shaped support mechanism 17 and the stepped structure are coordinated to achieve the positioning of the third input/output device 19, thereby improving robustness and stability of storing the third input/output device 19.

In some embodiments, the support mechanism 17 includes the wire harness structure 21. Because the first body 1 includes an interface disposed at the second side 5 for connecting the external wires 31, the wire harness structure 21 disposed at the support mechanism 17 restraints, guides, and standardizes the wires 31, thereby making the appearance of the electronic apparatus look nice and tidy. Specifically, the wire harness structure 21 may be a strip hole disposed at the frame-shaped support mechanism 17. The wires 31 pass through the strip hole to achieve the wiring restraint and standardization. To improve harness effectiveness, the strip hole is disposed at a part of the frame-shaped support mechanism 17 away from the second side 5, as shown in FIG. 12.

Figure 14:
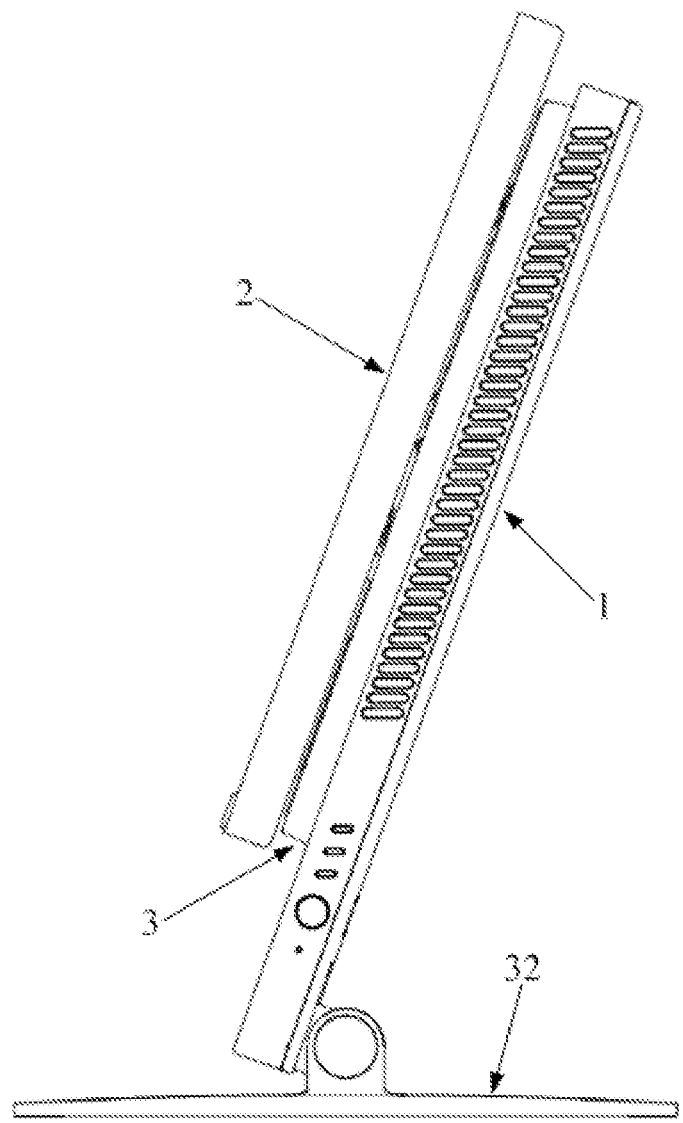
FIG. 14 is a schematic diagram illustrating a base supporting an exemplary electronic apparatus according to some embodiments of the present disclosure.

The support mechanism 17 supports the first body 1 through fixedly connecting to the first body 1 to form a herringbone structure. That is, the support mechanism 17 supports the first body 1 without an adjustable supporting angle. In addition, the support mechanism 17 may support the first body 1 in other manners. For example, as shown in FIG. 14, the first body 1 includes a base 32 at its bottom. The base 32 is rotatably connected to the first body 1. A relative rotation between the first body 1 and the base 32 adjusts a pitch angle of the electronic apparatus. For example, the first body 1 may be made standing vertically on the desktop to achieve a vertical support to the electronic apparatus (as shown in FIG. 3 and FIG. 6). In anther example, the first body 1 may be made standing tilted relative to the desktop to achieve a tilted support to the electronic apparatus (as shown in FIG. 14).

In addition, the first body 1 may include no support mechanism at its bottom. Instead, the first body 1 with a relatively large size may stand directly on the desktop. For example, when the first body 1 is the cube, the trapezoid block, or the frustum, etc., the electronic apparatus may stand directly on the desktop through the first body 1.

In some embodiments, as shown in FIGS. 11-18, the connector 3 and/or the second body 2 may include a positioning mechanism. The positioning mechanism may be extended or retracted perpendicular to the first side 4 to prevent or allow the second body 2 to rotate relative to the first body 1. As described previously, the second body 2 is able to rotate relative to the first body 1 to switch between the landscape mode and the portrait mode. If the relative position between the first body 1 and the second body 2 is not secured, accidental rotation of the second body 2 relative to the first body 1 may occur when the electronic apparatus is placed on the desktop or the user moves the electronic apparatus. The accidental rotation not only makes it inconvenient to move the electronic apparatus, but also requires additional operation of restoring the second body 2 after moving the electronic apparatus, thereby causing inconvenience to the user. Thus, the accidental rotation needs to be avoided.

In some embodiments, the electronic apparatus further includes the positioning mechanism to secure the second body 2 to the first body 1. After the positioning mechanism extends to secure the second body 2, the second body 2 is unable to rotate relative to the first body 1, no matter the electronic apparatus is in normal operation or being moved. That is, the attitude of the electronic apparatus does not change. The electronic apparatus is ensured to maintain its attitude no matter the electronic apparatus is in normal operation or being moved. When the user wants to change the attitude of the electronic apparatus, for example, from the first attitude to the second attitude or from the second attitude to the first attitude, the positioning mechanism can be retracted to release the second body 2. At this point, the user may rotate the second body 2 relative to the first body 1 to change the attitude. The configuration of the positioning mechanism in the electronic apparatus improves operation reliability and user experience of the electronic apparatus.

Figure 15:
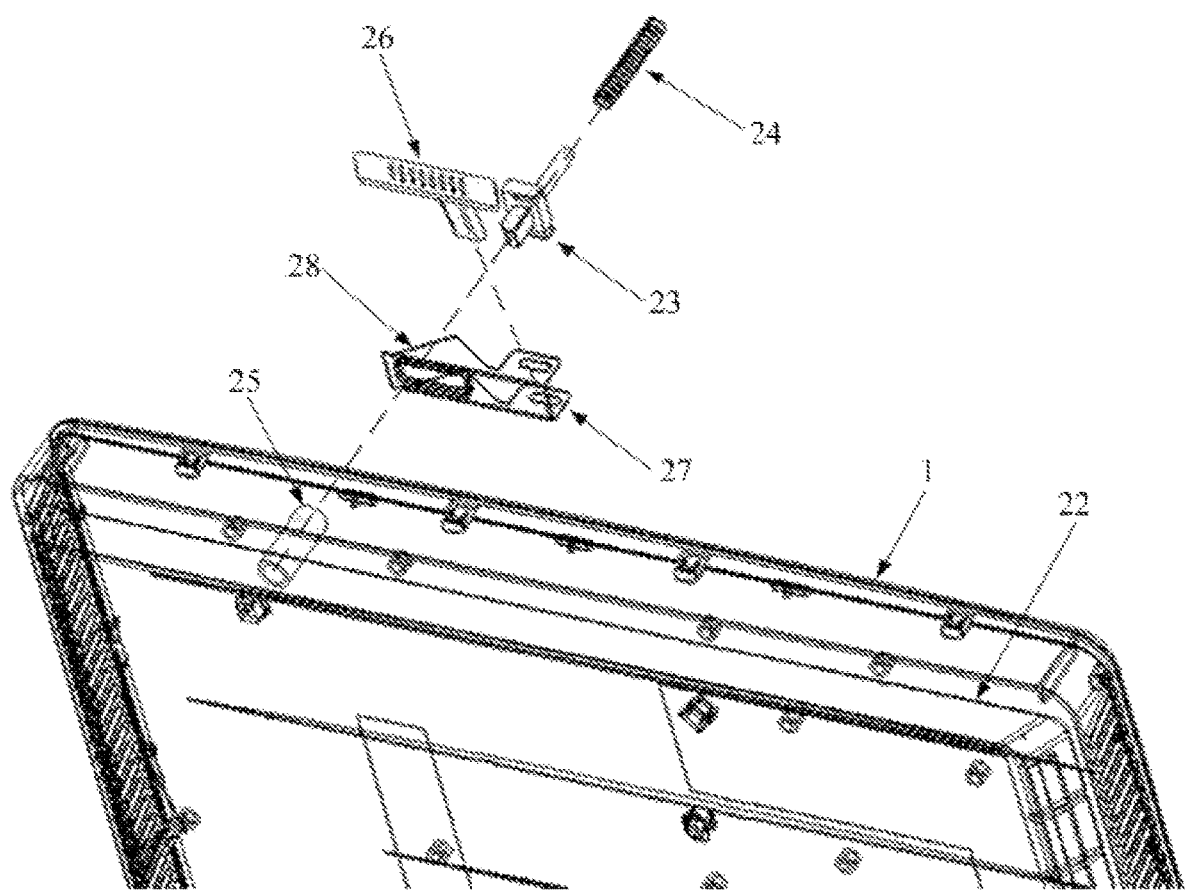
FIG. 15 is an exploded view of a positioning structure according to some embodiments of the present disclosure.
Figure 16:
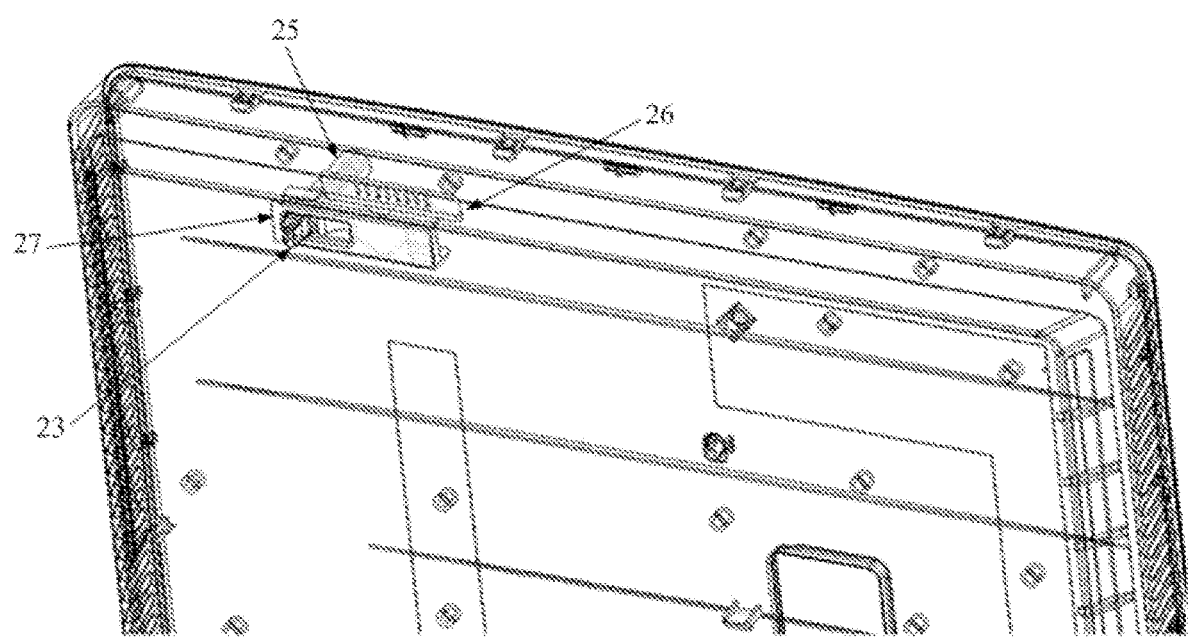
FIG. 16 is an assembly diagram of the positioning structure according to some embodiments of the present disclosure.

In some embodiments, as shown in FIG. 15 and FIG. 16, the positioning mechanism includes a locking hole disposed at the fourth side 8 of the second body 2, a locking member 23 disposed at the first side 4 of the first body 1 and capable of extending to the outside of an enclosure 22 of the connector 3 and retracting to the inside of the enclosure 22, an elastic member 24 configured to drive the locking member 23 to extend into the locking hole, an operation member 26 slidably disposed at a surface of the enclosure 22, and a transmission member 27 slidably disposed inside the enclosure 22. The transmission member 27 includes one end fixedly connected to the operation member 26 and moves in a direction parallel with the first side 4 when being driven by the operation member 26. The transmission member 27 includes another end an oblique edge 28. The locking member 23 is slidably coupled with the oblique edge 28, such that the movable transmission member 27 drives the locking member 23 to retract to the inside of the enclosure 22.

In some embodiments, the locking member 23 is a rod-shaped member for locking the second body 2. The second body 2 includes the locking hole. After the locking member 23 extends into the locking hole, the locking member 23 locks the second body 2. A tubular mounting member 25 is disposed at the first side 4 and protrudes from the first side 4. The locking member 23 is disposed inside the tubular mounting member 25 and capable of extending into and retracting from the tubular mounting member 25. The locking member 23 may extend to the outside of the enclosure 22 of the connector 3 to enter the locking hole, and may retract to the inside of the enclosure 22 to exit the locking hole.

In some embodiments, the elastic member 24 (e.g., a spring) is disposed inside the tubular mounting member 25 and at the same time is also sleeved on the locking member 23. The elastic member 24 applies an elastic force on the locking member 23, such that the locking member 23 tends to move (i.e., extend) to the outside of the enclosure 22. When the locking member 23 is aligned with the locking hole, the locking member 23 is driven by the elastic member 24 to enter the locking hole, thereby achieving automatic locking.

In some embodiments, the operation member 26 is disposed at an outer surface of the enclosure 22. The operation member 26 is for the user to apply a force to operate the positioning mechanism. The operation member 26 is slidably disposed at the enclosure 22. When the user needs to release position locking, the user may apply the force on the operation member 26 to move the operation member 26 at the enclosure 22 to drive the locking member 23 to retract. The operation member 26 drives the locking member 23 through the transmission member 27 that is slidably disposed inside the enclosure 22. One end of the transmission member 27 is fixedly connected to the operation member 26. After the transmission member 27 is connected to the operation member 26, the transmission member 27 is driven by the operation member 26 to move along a direction parallel with the support mechanism 17, that is, move along a direction perpendicular to the extension and retraction direction of the locking member 23. Another end of the transmission member 27 includes the oblique edge 28. The locking member 23 is slidably coupled with the oblique edge 28. When the transmission member 27 moves in the direction perpendicular to the extension and retraction direction of the locking member 23, the oblique edge 28 is slidably coupled with the locking member 23 to drive the locking member 23 to retract from the locking hole, thereby releasing the position locking between the first body 1 and the second body 2. The extension of the locking member 23 is automatically achieved through the elastic force applied by the elastic member 24. The extension operation does not need the operation member 26 to drive the transmission member 27.

Figure 18:
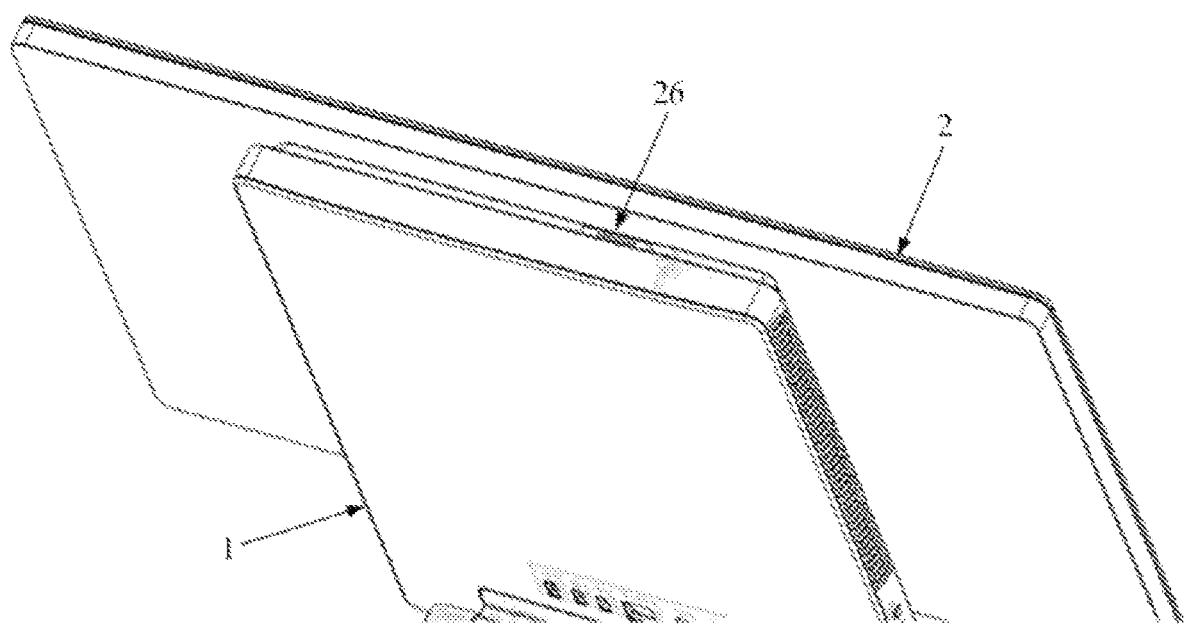
FIG. 18 is a schematic diagram illustrating a position of an operation member according to some embodiments of the present disclosure.

In addition, as shown in FIG. 18, the operation member 26 is located outside the enclosure 22 of the connector 3. That is, the operation member 26 is exposed externally on an outer surface of the electronic apparatus. For the convenience of user's unlocking operation, the operation member 26 is disposed at a top surface of the enclosure 22 of the connector 3. Because the connector 3 is concealed between the first body 1 and the second body 2, the arrangement of the operation member 26 minimizes its impact on the aesthetics of the appearance of the electronic apparatus.

Figure 17:
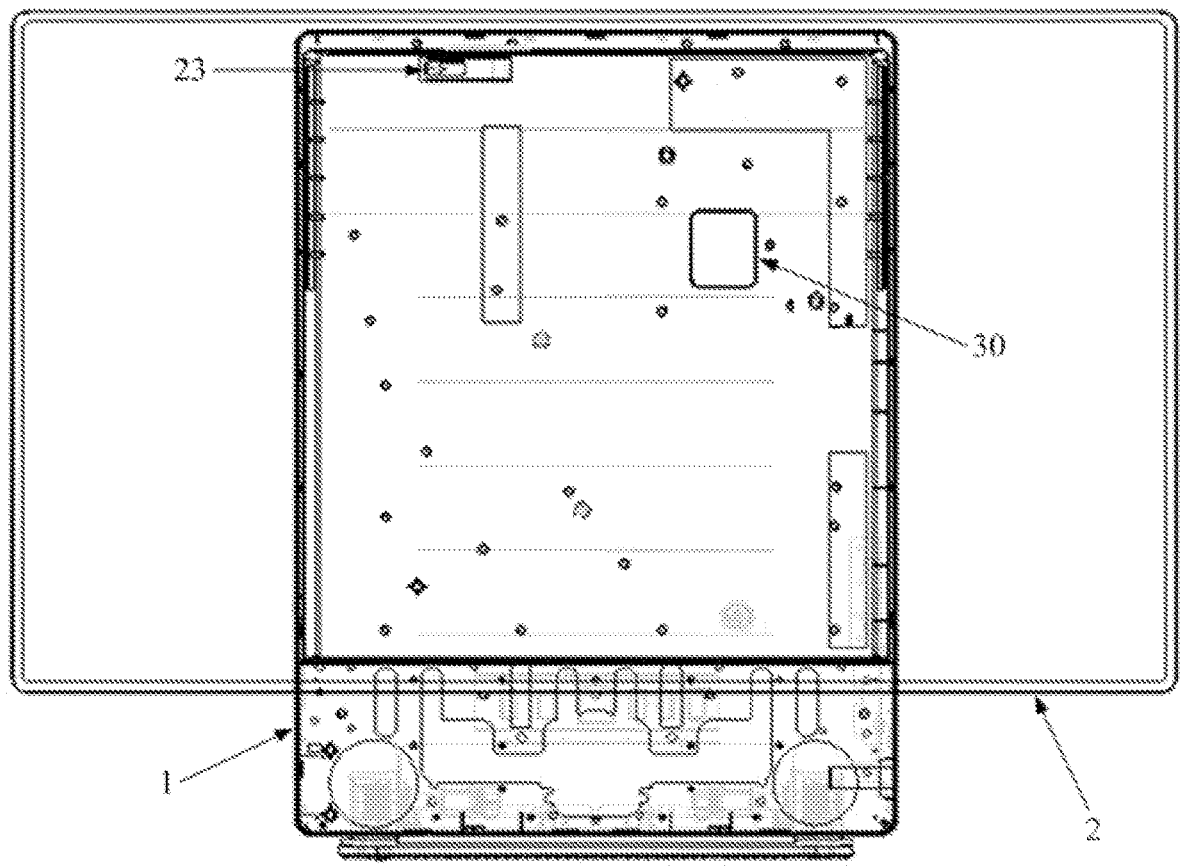
FIG. 17 is a schematic diagram illustrating a position of a wire port relative to the positioning structure according to some embodiments of the present disclosure.
Figure 19:
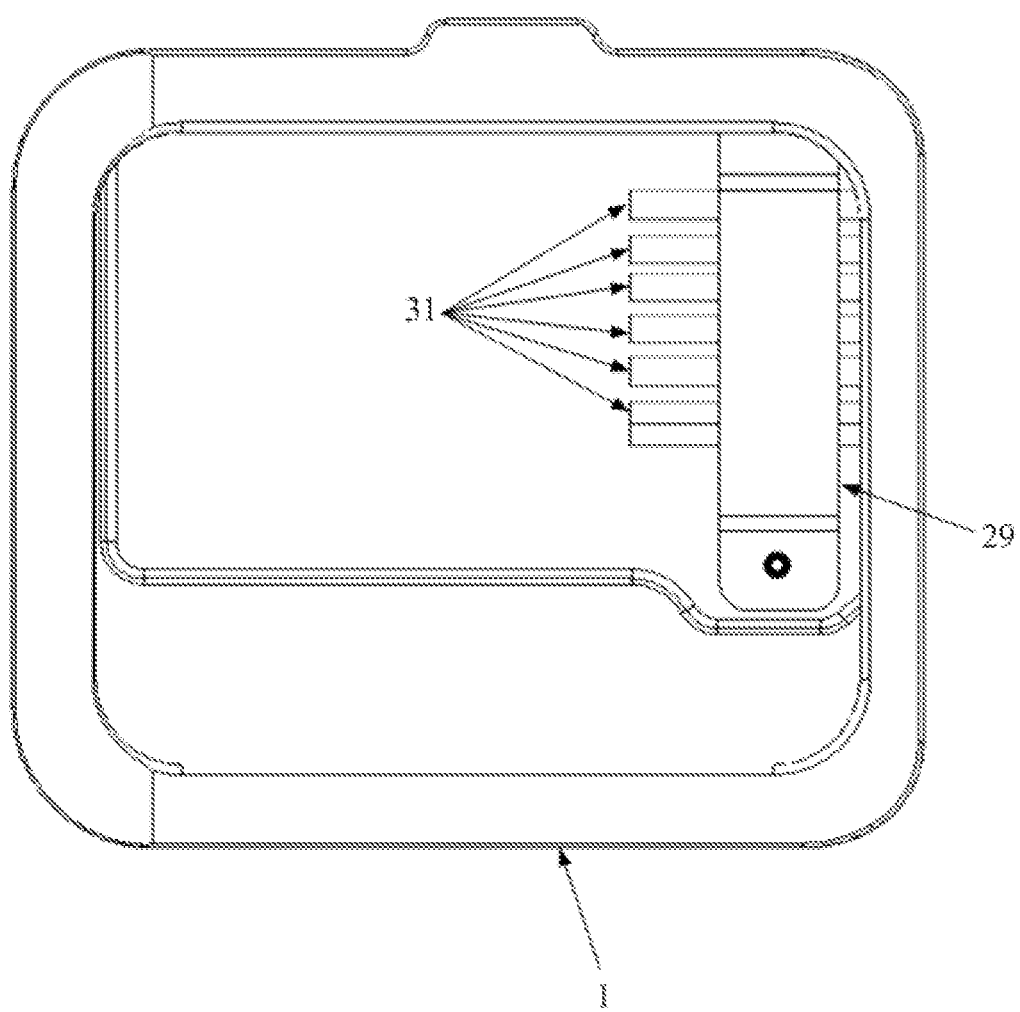
FIG. 19 is a top view of a wire management structure according to some embodiments of the present disclosure.
Figure 20:
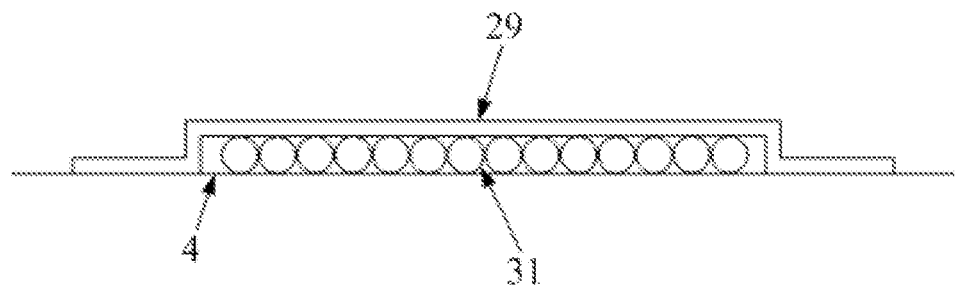
FIG. 20 is a front view of the wire management structure according to some embodiments of the present disclosure.

In some embodiments, the wires 31 that electrically connect between the first body 1 and the second body 2 are routed through the connector 3. The connector 3 includes a wire management structure internally. As shown in FIG. 19 and FIG. 20, the wire management structure includes a wire management component disposed at the first side 4 and a wire port 30 also disposed at the first side 4. The wire management component provides a wire routing path that fixes the wires 31 and evenly distributes the wires in parallel. The wires 31 are drawn out of the wire port 30 from the connector 3, as shown in FIG. 17.

When the electronic apparatus is a computer, the first body 1 is the motherboard of the computer, and the second body 2 is the display of the computer, the first body 1 and the second body 2 need to be electrically connected. Thus, the wires are needed to connect between the first body 1 and the second body 2. Because the connector 3 is located between the first body 1 and the second body 2, the wires 31 are accommodated inside the enclosure 22 of the connector 3. That is, the wires 31 are routed inside the connector 3. Thus, the wires 31 are prevented from being exposed outside the electronic apparatus, thereby making the appearance of the electronic apparatus look nice and tidy.

In addition, to make the wires 31 that is routed inside the connector 3 more standardized and to prevent the wires 31 from interfering normal operation of other components of the connector 3, the connector 3 includes the wire management structure. As shown in FIG. 19 and FIG. 20, the wire management component of the wire management structure includes a wire management member 29 disposed at a support plate. The wire management member 29 is trough-shaped and forms a wiring conduit with the first side 4. When passing through the wiring conduit, the wires 31 are laid on the support plate in parallel. The wire management member 29 also presses the wires 31 against the first side 4 to fix and restraint the wires 31. The wires 31 that pass through the wiring conduit are straightened and are routed through the wire port 30 and the connector 3 to enter the first body 1.

The electronic apparatus consistent with the present disclosure includes the first body and the second body. The first input/output device is disposed at the first side of the first body. The second input/out device is disposed at the third side of the second body. The connector is disposed at the first side of the first body and the fourth side of the second body. That is, the first body and the second body are connected through the connector. The second rotates relative to the first body through the connector. During the rotation of the second body, the orientations of the first side and the third side always substantially satisfy the same condition. That is, the connector makes the second body rotate in the plane relative to the first body. When the second input/output device disposed at the second body is the touch screen, the rotation of the second body in the plane makes the rotation of the touch screen stay in the plane.

The electronic apparatus consistent with the present disclosure includes the first attitude and the second attitude, such as the landscape mode and the portrait mode. The electronic apparatus includes multiple operation attitudes to substantially satisfy the user's diversified demands. In the first attitude and the second attitude, the second body does not block the first input/output device disposed at the first side to ensure the normal operation of the first input/output device regardless of the attitude of the electronic apparatus. Thus, the operation effectiveness of the electronic apparatus is improved. In the embodiments of the present disclosure, the rotation of the second body in the plane relative to the first body facilitates more operation attitudes of the electronic apparatus to substantially satisfy the user's diversified demands. When the electronic apparatus is in different attitudes, the first input/output device is ensured to operate normally, thereby improving the operation effectiveness of the electronic apparatus.

In the embodiments of the present disclosure, structures of various parts are described in a progressive manner. The description of the structure of each part focuses on the difference from existing structures. The whole and part of the electronic apparatus may be obtained by combining multiple above-described parts.

In addition, although exemplary embodiments have been described herein, their scope includes any and all implementations with equivalent elements, modifications, omissions, combinations (e.g., cross-over schemes of various embodiments), adaptations, or changes based on the present disclosure. The elements in the claims will be interpreted broadly based on the language adopted in the claims, are not limited to the examples described in the specification or during the implementation of the present disclosure, and the examples will be interpreted as non-exclusive. Therefore, the specification and embodiments are intended to be regarded as examples only, and the true scope and spirit are indicated by the appended claims and the full scope of their equivalents.

The above description is intended to be illustrative and not restrictive. For example, the aforementioned embodiments (one or more solutions) may be combined with each other. Other embodiments may be used by those skilled in the art when reading the specification. In addition, in the aforementioned embodiments, various features may be grouped together to simplify the description. This should not be construed as an intent that an unclaimed disclosed feature is necessary for any claim. On the contrary, the subject matter of the present disclosure may be less than all the features of the disclosed embodiments. Thus, the appended claims are incorporated into the detailed description as examples or embodiments, where each claim independently serves as a separate embodiment, and it is considered that these embodiments can be combined with each other in various combinations or permutations. The scope of the present disclosure should be determined with reference to the appended claims and the full scope of the equivalents entitled by these claims.

In the specification, specific examples are used to explain the principles and implementations of the present disclosure. The description of the embodiments is intended to assist comprehension of the methods and core ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. An electronic apparatus, comprising:
   a first body including a first side and a second side arranged opposite to each other, and including a first input/output device disposed at the first side;
   a second body including a third side and a fourth side arranged opposite to each other, and including a second input/output device disposed at the third side;
   a connector disposed at the first side and the fourth side; and
   a positioning mechanism extended or retracted perpendicular to the first side to prevent or allow the second body to rotate relative to the first body, the positioning mechanism including:
   a locking hole disposed at the fourth side of the second body;
   a locking member disposed at the first side of the first body and capable of extending to the outside of an enclosure of the connector and retracting to the inside of the enclosure;
   an elastic member configured to drive the locking member to extend into the locking hole;
   an operation member slidably disposed at a surface of the enclosure and capable of driving the locking member to retract from the locking hole; and
   a transmission member slidably disposed inside the enclosure to facilitate the operation member to retract the locking member;
   wherein:
   the second body rotates relative to the first body through the connector;
   during rotation of the second body, orientations of the first side and the third side substantially satisfy a same condition;
   the electronic apparatus includes a first attitude and a second attitude, which are switchable through the rotation of the second body; and
   the second body does not block the first input/output device when the electronic apparatus is in the first attitude and the second attitude.

2. The electronic apparatus according to claim 1, wherein:
   the third side of the second body has rectangular shape; or the second body in the first attitude and the second body in the second attitude substantially satisfy a vertical condition; or types of the first input/output device and the second input/output device are different; or in the first attitude and the second attitude, a center line of the third side and a center line of the first side substantially satisfy a coincidence condition, wherein the center lines are center lines that substantially satisfy a vertical condition with a load bearing surface for load bearing the electronic apparatus.

3. The electronic apparatus according to claim 1, wherein:
when the electronic apparatus is in the first attitude and the second attitude, the third side is partially projected on the first side.

4. The electronic apparatus according to claim 1, wherein:
the connector includes a connecting member configured to connect the first body with the second body, and the connecting member is configured to rotate and move relative to the first body to switch the electronic apparatus between the first attitude and the second attitude.

5. The electronic apparatus according to claim 4, wherein:
the connector includes a plurality of connecting members;
a plurality of slideways extending toward different directions is configured at the first body; and
each connecting member is rotatably connected to one of the plurality of slideways and is able to slide in the connected slideway.

6. The electronic apparatus according to claim 5, wherein:
the plurality of slideways includes strip grooves configured at the first body and includes a first strip groove and a second strip groove;
the plurality of connecting members includes a first connecting member and a second connecting member, rotatably and slidably configured in the first strip groove and the second strip groove, respectively;
the first strip groove is a straight strip groove having a straight extension trajectory parallel with a center line of the first side, and when the electronic apparatus switches from the first attitude to the second attitude, the first connecting member makes one reciprocating movement in the first strip groove;
the second strip groove includes a straight strip groove section having a straight extension trajectory and a curved strip groove section having a curved extension trajectory, and the straight strip groove section is tilted with reference to the center line to provide the straight strip groove section with two ends having different heights, and a higher end of the straight strip groove section is a first end; and one end of the curved strip groove section is located at the first end of the straight strip groove section, and another end of the curved strip groove section is away from the first end of the straight strip groove section, and has a height smaller than the height of the first end of the straight strip groove section, such that when the electronic apparatus switches from the first attitude to the second attitude, the second connecting member makes one reciprocating movement in a direction parallel with the center line.

7. The electronic apparatus according to claim 1, wherein:
the connector makes the second body unidirectionally rotate relative to the first body to switch from the first attitude to the second attitude; and
a marker is disposed at a force receiving position of the second body, wherein the force receiving position is configured to receive a rotatory force exerted on the second body to allow a switch from the first attitude to the second attitude.

8. The electronic apparatus according to claim 1, wherein:
the second side of the first body includes a support mechanism;
the support mechanism is used to support the first body and to form a storage space to store a third input/output device; and
the third input/output device is used for data transmission with the electronic apparatus through a wired or wireless method.

9. The electronic apparatus according to claim 8, wherein:
a positioning structure is configured at the support mechanism and/or the third input/output device to position the third input/output device in the storage space; and/or
a wire harness structure is configured at the support mechanism to harness wires.

10. The electronic apparatus according to claim 1, further including:
a marker disposed at a force receiving position of the second body to prompt a user where to apply a force to switch between the first attitude and the second attitude.

11. The electronic apparatus according to claim 1, further including:
a base rotatably connected to a bottom of the first body, wherein a relative rotation between the first body and the base adjusts a pitch angle of electronic apparatus.

* * * * *